(12) United States Patent
Kaulgud et al.

(10) Patent No.: US 11,282,014 B2
(45) Date of Patent: Mar. 22, 2022

(54) USING NATURAL LANGUAGE PROCESSING AND SIMILARITY ANALYSIS TECHNIQUES TO SELECT A BEST-FIT AUTOMATION SERVICE

(71) Applicant: Accenture Global Solutions Limited, Dublin (IE)

(72) Inventors: Vikrant S. Kaulgud, Pune (IN); Sanjay Podder, Thane (IN); Milind Savagaonkar, Bangalore (IN); Vibhu Saujanya Sharma, Bangalore (IN); Janardan Misra, Bangalore (IN); Poulami Debnath, Bangalore (IN); Rohit Mehra, Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 922 days.

(21) Appl. No.: 15/983,702

(22) Filed: May 18, 2018

(65) Prior Publication Data
US 2018/0341885 A1    Nov. 29, 2018

(30) Foreign Application Priority Data
May 25, 2017    (IN) .............................. 201741018382

(51) Int. Cl.
*G06Q 10/06*    (2012.01)

(52) U.S. Cl.
CPC ......... *G06Q 10/0633* (2013.01); *G06Q 10/06* (2013.01); *G06Q 10/06316* (2013.01); *G06Q 10/06393* (2013.01)

(58) Field of Classification Search
None
See application file for complete search history.

(56) References Cited

U.S. PATENT DOCUMENTS

| 2018/0060779 | A1* | 3/2018 | Suri | G06Q 10/06316 |
| 2019/0025800 | A1* | 1/2019 | Goyal | G06F 40/30 |

* cited by examiner

*Primary Examiner* — Cory W Eskridge
(74) *Attorney, Agent, or Firm* — Harrity & Harrity, LLP

(57) ABSTRACT

A device may receive, from a user device, a request for an automation service for a project. The device may analyze the request to identify one or more input keywords. The device may obtain, by using the one or more input keywords to search one or more data sources, project information for a set of projects and/or automation services information for a set of automation services. The device may determine one or more similar projects and/or one or more similar automation services by analyzing the project information and/or the automation services information. The device may provide, to the user device, a recommendation that identifies one or more automation services associated with the one or more similar projects and/or the one or more similar automation services.

20 Claims, 15 Drawing Sheets

Recommendation Module 212

| Natural Language Processing Submodule 212-1 | Ontology Processing Submodule 212-2 | Similarity Analysis Submodule 212-3 |

Continuous Assessment Module 213

| Automation Rules Submodule 213-1 | Query Generator Submodule 213-2 | Notification Generator Submodule 213-3 |

Feedback Module 214

| Feedback Processing Submodule 214-1 | Structured Feedback Analyzer Submodule 214-2 | Free-form Feedback Analyzer Submodule 214-3 | Feedback Generator Submodule 214-4 |
|---|---|---|---|
| Scoring Submodule 214-5 | Investment Analysis Submodule 214-6 | Deployment Analyzer Submodule 214-7 | Satisfaction Determination Submodule 214-8 |

USING NATURAL LANGUAGE PROCESSING AND SIMILARITY ANALYSIS TECHNIQUES TO SELECT A BEST-FIT AUTOMATION SERVICE

RELATED APPLICATION

This application claims priority under 3 U.S.C. § 119 to Indian Provisional Patent Application No. 201741018382, filed on May 25, 2017, the content of which is incorporated by reference herein in its entirety.

BACKGROUND

Automation may refer to systems or processes that reduce or eliminate human intervention. An automation tool may recommend one or more automation services to a user based on a query.

SUMMARY

According to some possible implementations, a device may include one or more processors to receive, from a user device, a request for an automation service for a project. The one or more processors may analyze the request to identify one or more input keywords. The one or more processors may obtain information associated with automation services by using the one or more input keywords to search a first data source. The one or more processors may analyze, using a first similarity analysis technique, the information associated with automation services to identify a set of candidate automation services. The one or more processors may obtain, from a second data source, project information for a set of projects and additional project information for a set of additional projects. The set of projects may include projects that use a candidate automation service of the set of candidate automation services. The set of additional projects may include projects that share at least one project characteristic with the project information. The one or more processors may determine one or more similar projects by using a second similarity analysis technique to analyze the project information for the set of projects and the additional project information for the set of additional projects. The one or more processors may obtain, from a third data source, automation services information for a set of automation services. The set of automation services may include automation services used by the one or more similar projects. The one or more processors may provide, to the user device, a recommendation that identifies at least one of the set of candidate automation services and/or the automation services included in the set of automation services.

According to some possible implementations, a method may include receiving, by a device and from a user device, a request for an automation service for a project. The request may include information associated with a task of the project, information indicating one or more project characteristics of the project, and/or information associated with one or more automation services. The method may include obtaining, by the device and from one or more data sources, project information for a set of projects and/or automation services information for a set of automation services. The method may include determining, by the device, one or more similar projects and/or one or more similar automation services by analyzing the project information and/or the automation services information. The one or more similar projects may be associated with at least one of the one or more automation services selected for the project. The one or more similar automation services may be associated with at least one of the one or more automation services associated with the project. The method may include providing, by the device and to the user device, a recommendation that identifies one or more automation services associated with the one or more similar projects or at least one of the one or more similar automation services.

According to some possible implementations, a non-transitory computer-readable medium may store one or more instructions that, when executed by one or more processors, cause the one or more processors to receive, from a user device, a request for an automation service for a project. The one or more instructions may cause the one or more processors to analyze the request to identify one or more input keywords. The one or more instructions may cause the one or more processors to obtain, by using the one or more input keywords to search one or more data sources, project information for a set of projects and/or automation services information for a set of automation services. The one or more instructions may cause the one or more processors to determine, one or more similar projects and/or one or more similar automation services by analyzing the project information and/or the automation services information. The one or more instructions may cause the one or more processors to provide, to the user device, a recommendation that identifies one or more automation services associated with the one or more similar projects and/or the one or more similar automation services.

BRIEF DESCRIPTION OF THE DRAWINGS

FIGS. 2A and 2B are diagrams of an example environment in which systems and/or methods, described herein, may be implemented;

DETAILED DESCRIPTION

Figure 1A:
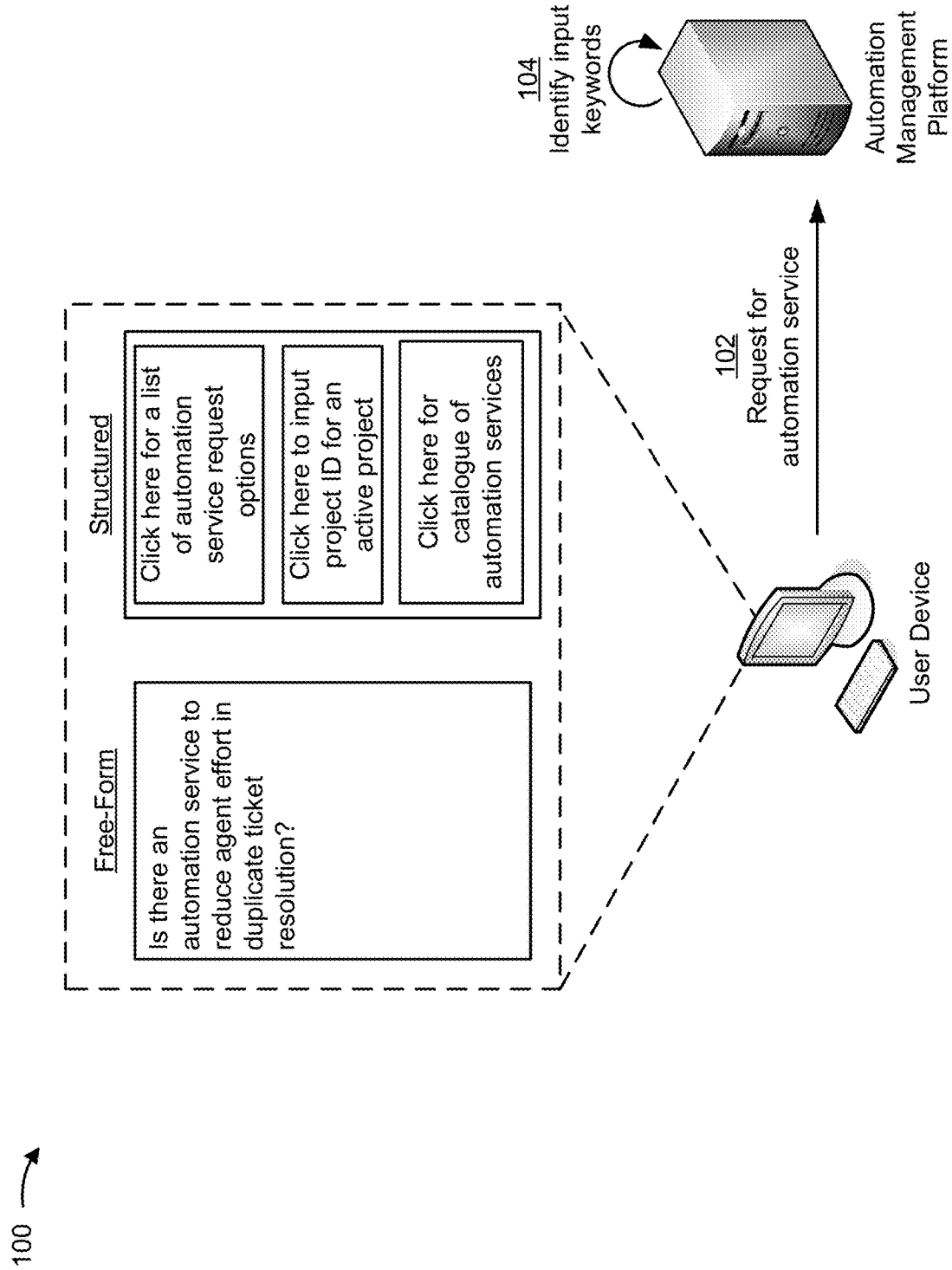
FIGS. 1A-1H are diagrams of an overview of example implementation described herein.

The following detailed description of example implementations refers to the accompanying drawings. The same reference numbers in different drawings may identify the same or similar elements.

An automation tool may recommend one or more automation services to a user, such as a business analyst, a project manager, a corporate executive, or the like. For example, an automation tool may receive a request for an automation service, and may perform a search technique to identify a recommended automation tool. However, the automation tool may not provide the best available automation service, may not support the needs of a novice user, may not support organizational analytics, may not provide feedback recommendation and refinement, and/or the like. Additionally, the automation tool may ineffectively utilize processing resources by selecting an automation service that is a poor fit for the user and by having to perform additional searches to select a proper automation service.

Some implementations described herein provide an automation management platform that recommends a best-fit automation service. For example, the automation management platform may receive, from a user device, a request for an automation service for a project. In this case, the automation management platform may use natural language processing techniques and/or similarity analysis techniques to identify one or more best-fit automation services. Additionally, the automation management platform may provide the one or more best-fit automation services to the user device. Furthermore, after an automation service deploys, the automation management platform may receive assessment information and/or feedback information relating to the deployed automation service, and may perform one or more actions associated with improving performance of the deployed automation service or one or more actions associated with deploying an alternative automation service.

By using natural language processing and similarity analysis techniques to identify one or more automation services, the automation management platform is able to provide a novice user (i.e., a user without knowledge of available automation services) with a best-fit automation service. Additionally, by analyzing a single query to select a best-fit automation service, the automation management platform conserves processing resources relative to an automation tool that selects an inefficient or improper automation service, and that has to perform an additional search to select another automation service to identify the best-fit automation service. Furthermore, the automation management platform may provide feedback recommendation and refinement, thereby conserving processing resources that might otherwise be used to correct errors and/or to search for another automation service.

FIGS. 1A-1H are diagrams of an overview of example implementation 100 described herein. As shown in FIGS. 1A-1D, example implementation 100 shows an automation management platform for providing a recommendation for an automation service to a user device. As shown in FIGS. 1E-1H, the user device may deploy the recommended automation service and the automation management platform may monitor the deployed automation service. In this case, the automation management platform may perform one or more actions to improve performance of the deployed automation service or one or more actions to deploy an alternative automation service.

As shown in FIG. 1A, a user may access a user interface of the user device to input a request for an automation service for a project. For example, the user may provide input into a free-form text box and/or may interact with a structured text box. In this case, the user may input "is there an automation service to reduce agent effort in duplicate ticket resolution?" into a free-form text box of the user interface. In other cases, the user may access a structured user interface menu, may select an option from a drop-down menu, may input a project identifier for a project (e.g., to search for similar projects and automation services utilized by the similar projects), may view a catalogue of available automation services, and/or the like. As shown by reference number 102, the user providing input may cause the automation management platform to receive the request.

As shown by reference number 104, the automation management platform may analyze the request to identify one or more input keywords. For example, the automation management platform may use one or more natural language processing techniques to analyze the request. An input keyword may be a noun, a verb, and/or any word that may be useful in recommending an automation service. In some implementations, the automation management platform may identify one or more input keywords by assigning a parts of speech tag to one or more words associated with the request, by removing one or more stop words associated with the request, and by using the parts of speech tags to identify one or more nouns and/or verbs associated with the request. In this way, the automation management platform may identify one or more input keywords that may be further processed to determine a best-fit automation service.

Figure 1B:
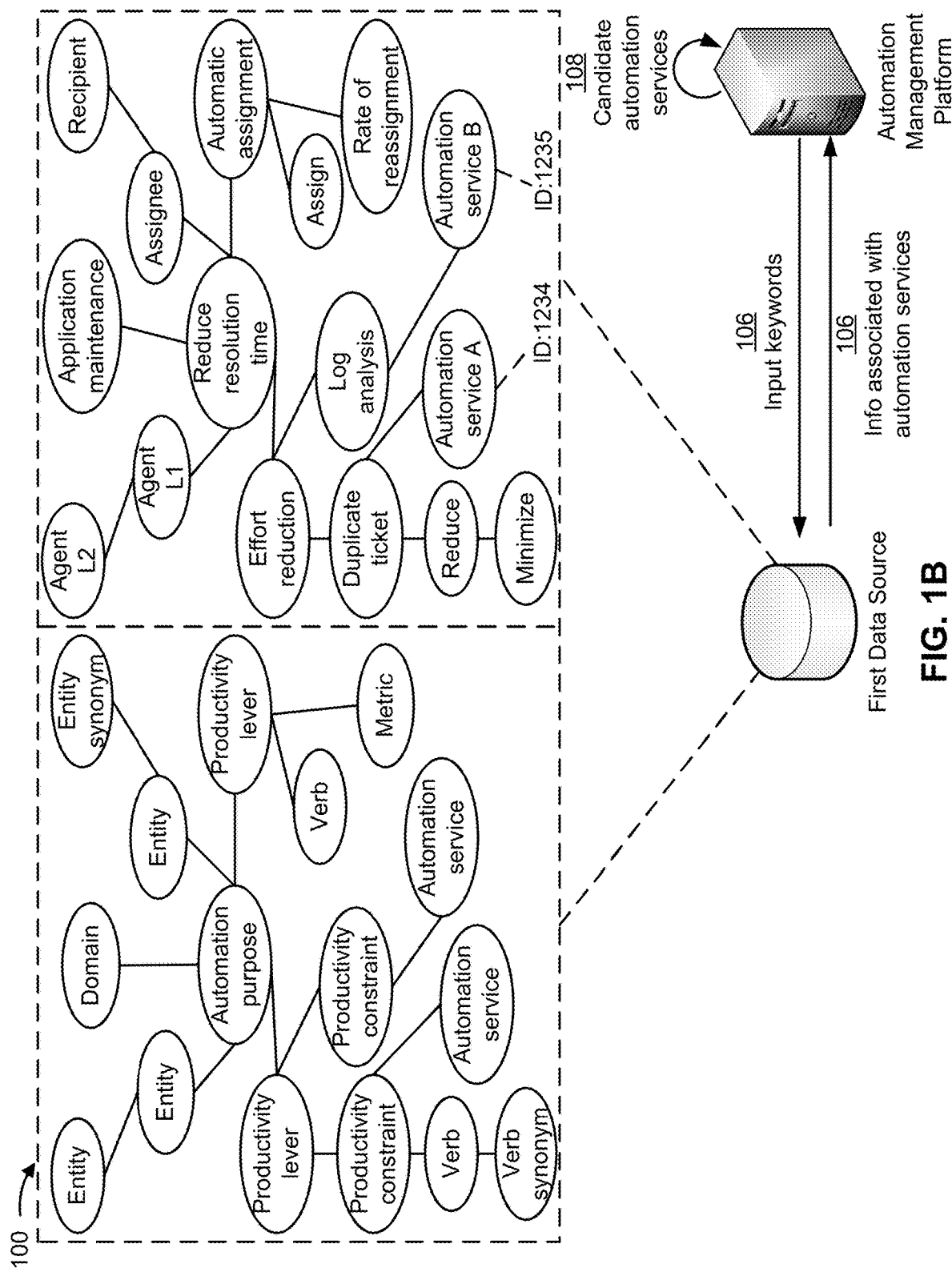

As shown in FIG. 1B, a first data source may be associated with a graph data structure that stores information associated with automation services. The information associated with automation services may be stored as nodes of the graph data structure, and may include information indicating one or more automation domains, one or more automation purposes, one or more automation constraints, one or more automation levers, one or more automation services (with automation service identifiers stored as metadata), one or more nouns and/or verbs relating to the automation services, and/or the like. An automation domain may indicate a category that includes a particular type of automation service. An automation purpose may indicate a purpose with which one or more automation services may serve. An automation constraint may identify an issue associated with the automation purpose (e.g., an issue relating to quality, productivity, technology, etc.). An automation lever may indicate a solution to an automation purpose or to an automation constraint (e.g., a solution relating to productivity, a solution relating to quality, etc.). An automation service may be a system or a process for executing one or more tasks associated with a project, and may store an automation service identifier as metadata. A noun and/or a verb may describe properties or characteristics of an automation purpose, an automation lever, an automation constraint, an automation service, and/or the like.

As shown by reference number 106, the automation management platform may use the one or more input keywords (e.g., the one or more nouns and/or verbs) to search the graph data structure for information associated with automation services. For example, the automation management platform may use the one or more input keywords to identify one or more automation levers (productivity levers, quality levers, etc.) that are associated with at least one matching noun and/or verb. In this case, the automation management platform may obtain all (or some) nodes associated with the automation levers, such as automation domain nodes, automation constraint nodes, automation service nodes, matching noun and/or verb nodes, and/or the like.

As shown by reference number 108, the automation management platform may analyze the information associated with the automation services to identify a set of candidate automation services. For example, the automation management platform may perform a similarity analysis to determine one or more similarity scores for one or more nouns and/or one or more verbs obtained from the graph data structure. The similarity analysis may be a lexical analysis technique, a semantic analysis technique, and/or the like.

Additionally, the automation management platform may determine overall similarity scores for one or more automation levers obtained from the graph data structure. For example, the automation management platform may determine an overall similarity score for an automation lever by determining an average similarity score for the one or more nouns and/or verbs associated with the automation lever. In this case, the automation management platform may identify an automation lever with a highest overall similarity score. Additionally, the automation management platform may identify an automation purpose associated with the automation lever with the highest overall similarity score. In this case, the automation management platform may use automation services associated with the identified automation purpose as the set of candidate automation services.

In this way, the automation management platform may identify a set of candidate automation services that may be further processed to determine a best-fit automation service.

Figure 1C:
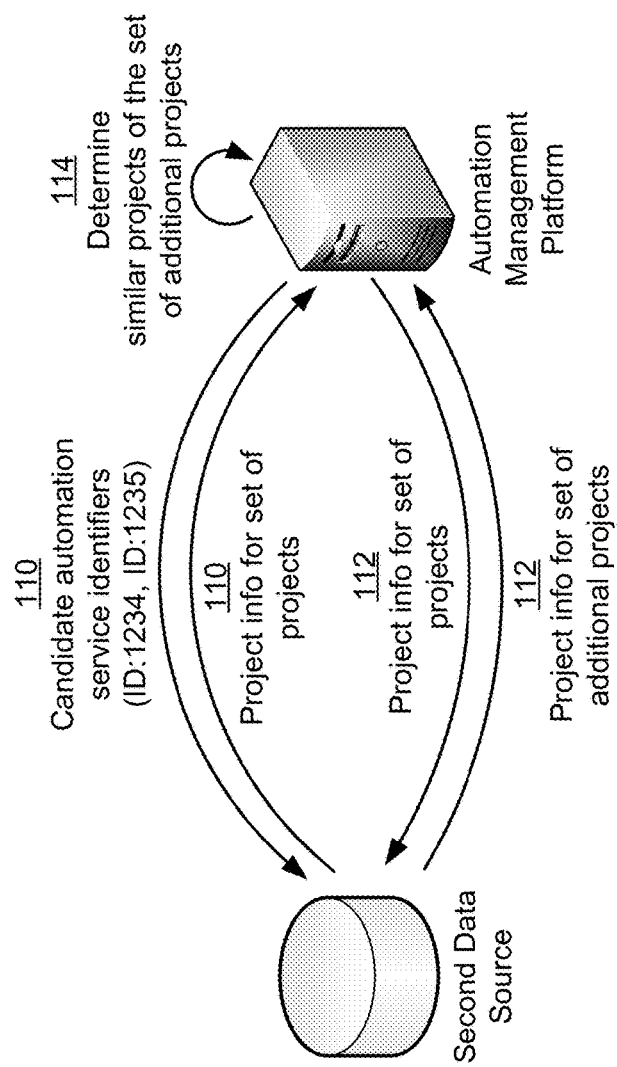

As shown in FIG. 1C, and by reference number 110, the automation management platform may obtain project information for a set of projects that use the candidate automation services. For example, the automation management platform may use candidate automation service identifiers to search a second data source to obtain project information for a set of projects that use the candidate automation services. Project information may include a set of project characteristics that identify administrative information for a project, information relating to one or more tasks of a project, information relating to project expectations, information relating to automation services for a project, and/or the like.

As an example, the automation management platform may use automation service identifier 1234 (for automation service A) and automation service identifier 1235 (for automation service B) to search a data structure associated with the second data source. In this case, the search results may include project information for a set of projects that have deployed automation service A and/or automation service B.

As shown by reference number 112, the automation management platform may obtain project information for a set of additional projects. For example, the automation management platform may use project characteristics of the set of projects to obtain project information for a set of additional projects. In some cases, the automation management platform may search the second data source with a filter that allows the automation management platform to indicate particular project characteristics of the set of projects. In this case, the search results may include project information for a set of additional projects that include at least one matching project characteristic with the set of projects.

As shown by reference number 114, the automation management platform may determine one or more similar projects of the set of additional projects. For example, the automation management platform may perform one or more similarity analysis techniques to determine one or more similar projects. A similarity analysis technique may include a Cosine similarity analysis technique, a Boolean or binary match technique, a Jaccard similarity analysis technique, a Euclidean similarity analysis technique, and/or the like.

In some implementations, the automation management platform may select one or more similarity analysis techniques based on data types. For example, the project information for the set of projects and the project information for the set of additional projects may include project characteristics, and the project characteristics may be associated with different data types. A data type may be a string data type, an integer data type, a Boolean data type, and/or the like. As an example, if a project characteristic uses a Boolean data type, the automation management platform may select a Boolean match technique for analyzing project characteristics of the Boolean data type.

Additionally, the automation management platform may perform the one or more selected similarity analysis techniques to determine one or more similarity scores. For example, the automation management platform may compare project characteristics of the set of projects and project characteristics of the set of additional projects to determine one or more similarity scores for project characteristics associated with the set of additional projects. In this case, the automation management platform may determine an overall similarity score for each project of the set of additional projects. If an overall similarity score for an additional project satisfies a threshold level of similarity with a project that uses the candidate automation services, then the automation management platform may identify the additional project as a similar project.

In this way, the automation management platform determines similar projects that may be used in identifying a best-fit automation service.

Figure 1D:
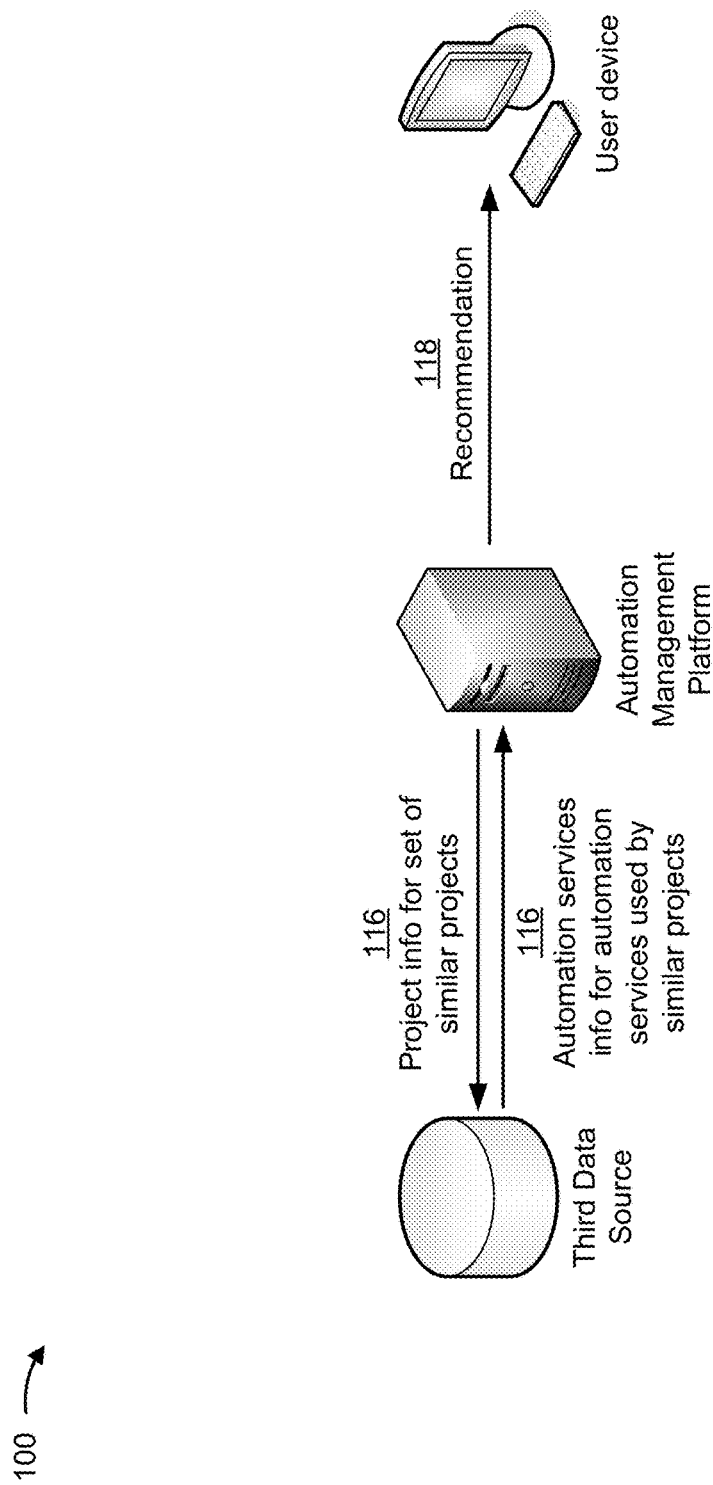

As shown in FIG. 1D, and by reference number 116, the automation management platform may use project information for the set of similar projects to search a third data source to identify automation services used by the set of similar projects. For example, the project information for the set of similar projects may include a set of project identifiers, and the automation management platform may use the set of project identifiers to search the third data source for automation services information for automation services that are used by the similar projects. In this case, the third data source may store, with automation services information for an automation service, project identifiers for projects that use the automation service. In other cases, the second data source may store, with the project information, automation service identifiers for automation services that are used by the similar projects, and the automation management platform may provide a recommendation without searching the third data source.

As shown by reference number 118, the automation management platform may provide a recommendation to the user device. For example, the automation management platform may generate a recommendation and may provide the recommendation to the user device. The recommendation may include a recommendation for a particular automation service (e.g., an automation service with a highest similarity score) or for a group of automation services (e.g., the set of candidate automation services, the automation services used by the similar projects, etc.).

By using natural language processing and/or similarity analysis techniques to recommend one or more automation services, the automation management platform ensures that a user is able to deploy a best-fit automation service.

Figure 1E:
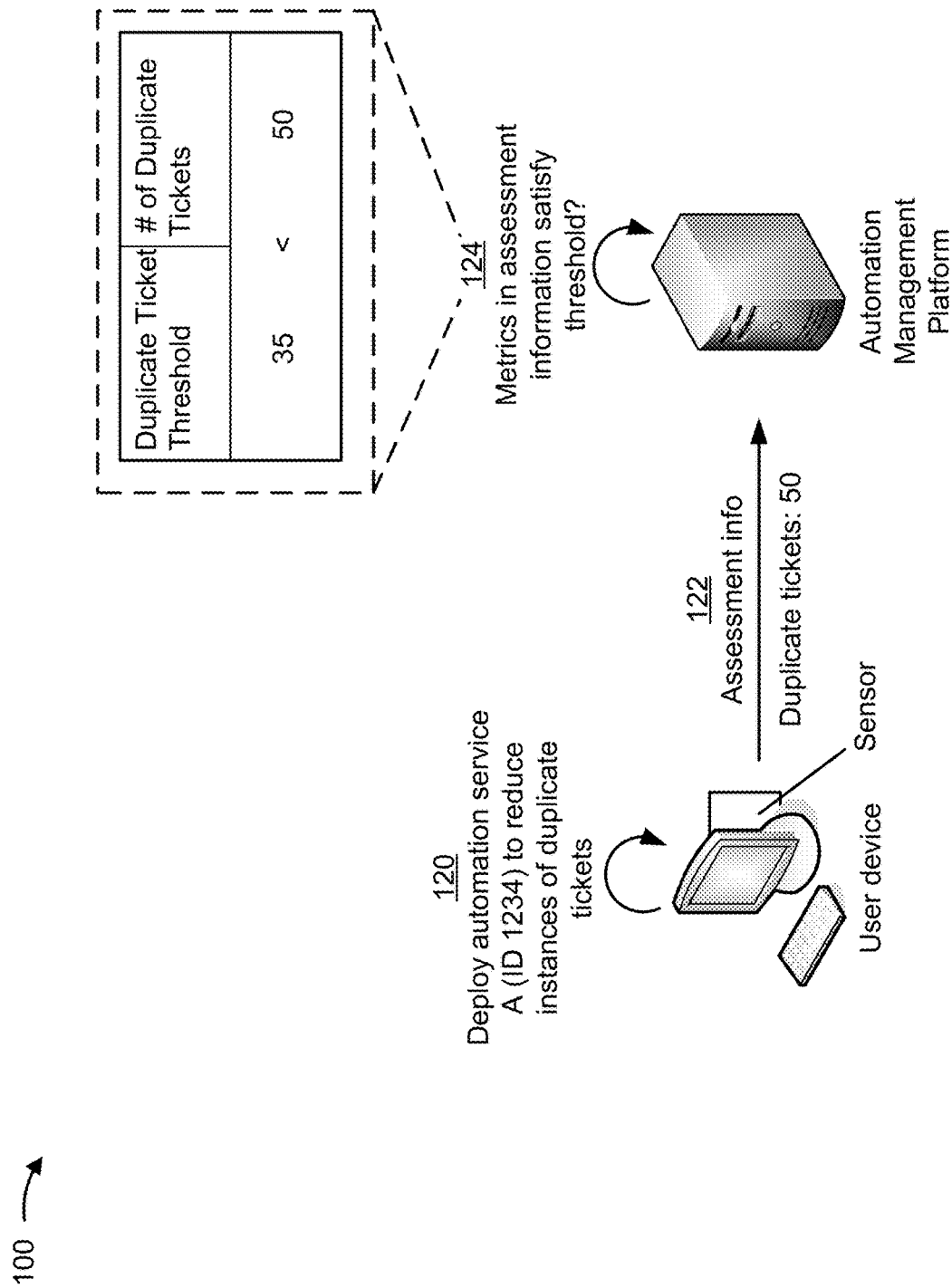

As shown in FIG. 1E, and by reference number 120, the user device may deploy an automation service for reducing a number of instances of duplicate tickets. For example, a business may issue tickets to resolve issues encountered by customers, and the user device may deploy automation service A to reduce a number of instances of duplicate tickets. As an example, a duplicate ticket may occur when two different customer service representatives spend resources solving the same issue.

As shown by reference number 122, the automation management platform may receive, from the user device, assessment information associated with the deployed automation service. Assessment information may include a set of metrics for measuring performance standards of a deployed automation service. The set of metrics may include metrics associated with time, cost, quality, productivity, and/or the like. In this case, the assessment information may include information indicating a number of duplicate tickets over a time interval (e.g., 50 duplicate tickets in an hour). In some implementations, the assessment information may be monitored via an automation monitoring element (e.g., a sensor, a tap, a script, a plug-in, etc.) capable of sensing assessment information from a deployed automation service.

As shown by reference number 124, the automation management platform may determine whether one or more metrics included in the assessment information satisfy a threshold. For example, the automation management platform may compare the one or more metrics and one or more thresholds to determine whether a metric of the one or more metrics satisfies a threshold. A threshold may be used as a limit or a boundary (e.g., an upper boundary, a lower boundary, etc.) to determine whether a deployed automation service is satisfying a particular performance standard (e.g., a performance standard relating to time, cost, productivity, quality, etc.). In this case, the automation management platform may determine that a number of duplicate ticket occurrences (e.g., 50 duplicate tickets in the past hour) satisfies a duplicate ticket threshold (e.g., 35 duplicate tickets per hour).

Figure 1F:
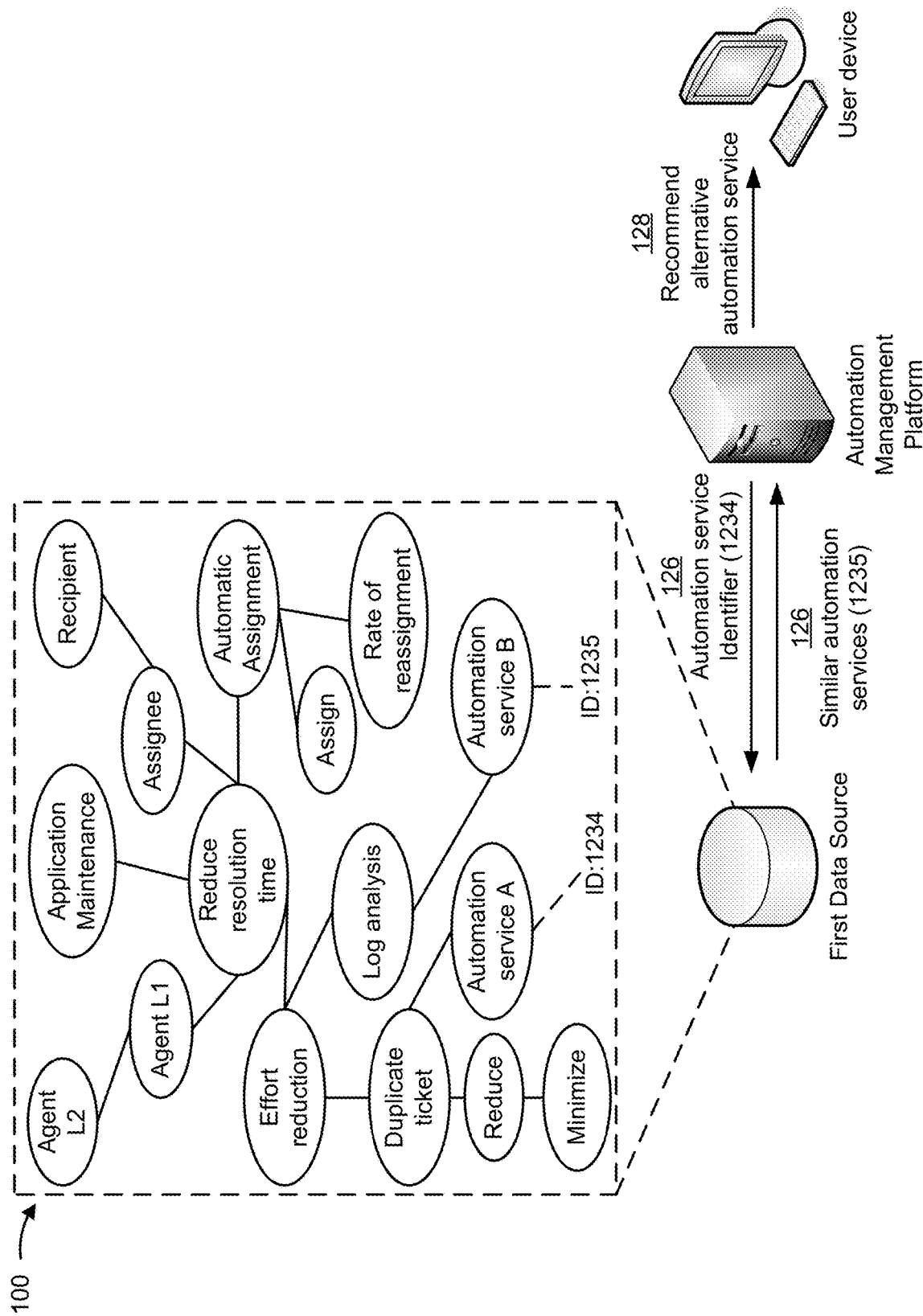

As shown in FIG. 1F, a metric value satisfying a threshold may cause the automation management platform to perform one or more actions to improve performance of the deployed automation service or to recommend an alternative automation service. As shown by reference number 126, the automation management platform may use an automation service identifier for the deployed automation service (e.g., automation service identifier 1234) to search the first data source to obtain automation service identifiers for similar automation services (e.g., automation service identifier 1235). In some implementations, the automation management platform may search the first data source using one or more other search terms, such as a domain name, an automation service name, a noun or verb associated with the automation service (e.g., "ticket resolution," "ticket support," etc.), and/or the like. In some implementations, the automation management platform may perform a similarity analysis on the similar automation services to identify an alternative automation service.

As shown by reference number 128, the automation management platform may provide, to the user device, a recommendation to deploy the alternative automation service. For example, the automation management platform may generate a recommendation to deploy the alternative automation service, and may provide the recommendation to the user device. In some implementations, the automation management platform may automatically deploy the alternative automation service or cause the alternative automation service to be automatically deployed. In some implementations, the automation management platform may perform one or more other actions, such as updating the deployed automation service, generating a request for a hardware upgrade or a hardware replacement for a device hosting the deployed automation service, generate instructions indicating how to properly use the deployed automation service, and/or the like.

In this way, the automation management platform performs one or more actions to ensure that a deployed automation service is a best-fit automation service for a project.

Figure 1G:
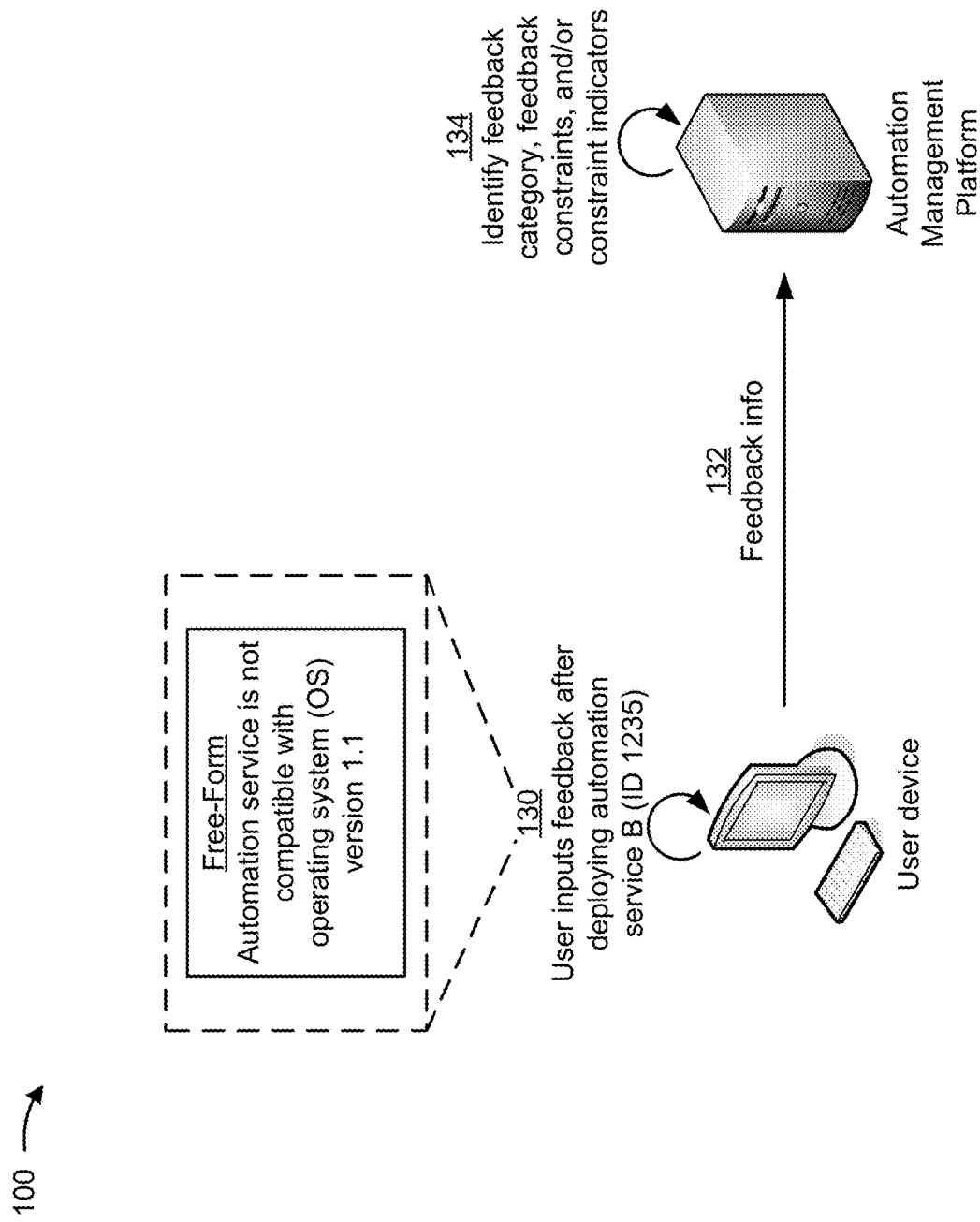

As shown in FIG. 1G, and by reference number 130, a user may interact with a user interface of the user device to input feedback information after deploying automation service B. For example, a user may interact with the user interface to provide free-form feedback information indicating that automation service B is not compatible with operating system version 1.1. As shown by reference number 132, the automation management platform may receive the feedback information from the user device.

As shown by reference number 134, the automation management platform may analyze the feedback information to identify a feedback category, one or more feedback constraints, and/or one or more constraint indicators. A feedback keyword may be a noun, a verb, and/or any word included in the feedback information that is associated with describing a particular issue relating to the deployed automation service. A feedback category may be a category that includes one or more different types of feedback, such as an installation category, a user experience category, a documentation category, a compatibility category, and/or the like. A feedback constraint may be any software application, software element, and/or software execution requirement associated with the deployed automation service. A software execution requirement may include a memory requirement, a bandwidth requirement, an operating system requirement, and/or the like. A constraint indicator may be a value (e.g., a string of text) indicating whether a particular constraint is compatible with a particular automation service (e.g., "is compatible with," "is not compatible with," etc.).

In some implementations, the automation management platform may identify a feedback category, one or more feedback constraints, and/or one or more constraint indicators by analyzing the feedback keywords with one or more natural language processing techniques, as described elsewhere herein. As an example, the automation management platform may analyze the feedback information to identify compatibility as the feedback category, an operating system requirement (e.g., operating system version 1.1) as the feedback constraint, and "not compatible with" as the constraint indicator.

In this way, the automation management platform identifies a feedback category, one or more feedback constraints, and/or one or more constraint identifiers that may be stored in a data structure and subsequently processed to generate a recommendation, as described further herein.

Figure 1H:
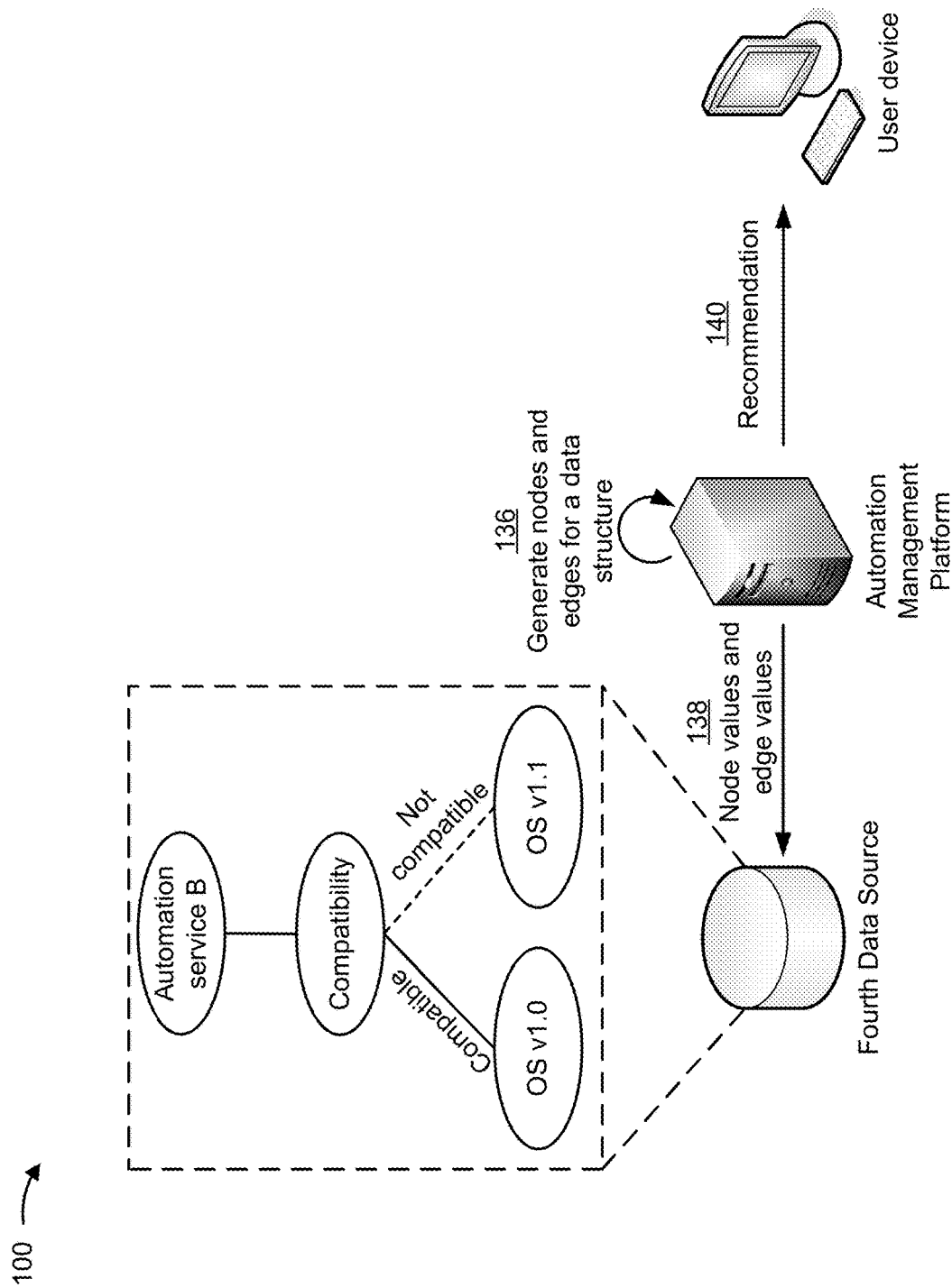

As shown in FIG. 1H, and by reference number 136, the automation management platform may use the feedback category, the one or more feedback constraints, and/or the one or more constraint indicators to generate nodes and edges for a data structure. For example, the automation management platform may generate nodes and edges for a graph data structure associated with a fourth data source.

As shown by reference number 138, the automation management platform may provide, to the fourth data source, node values and edges values associated with the feedback category, the one or more feedback constraints, and/or the one or more constraint indicators. Shown as an example, the graph data structure may store the feedback constraint and the constraint indicator as a child node and an edge to the feedback category (e.g., operating system version 1.1 and the string "not compatible" are stored within a compatibility category).

As shown by reference number 140, the automation management platform may provide a recommendation to the user device. For example, the automation management platform may generate a recommendation, and may provide the recommendation to the user device. The recommendation may be a recommendation to update the deployed automation service (e.g., by reinstalling, upgrading, or downgrading software), a recommendation that includes instructions indicating how to properly use the deployed automation service, a recommendation to deploy another automation service, and/or the like. In some implementations, the automation management platform may search the graph data structure to determine which recommendation to make, as described further herein. In some implementations, automation management platform 210 may use one or more application programming interfaces (APIs) to automatically carry out one or more of the recommendations.

By processing project information and/or automation services information to recommend an automation service, deploying the automation service, processing assessment information and/or feedback information associated with the deployed automation service, and generating an additional recommendation, the automation management platform ensures that the automation service used for the project is a best-fit automation service.

As indicated above, FIGS. 1A-1H are provided merely as an example. Other examples are possible and may differ from what was described with regard to FIGS. 1A-1H. For example, and as described in detail with regard to FIG. 7, the automation management platform may determine an organizational-level satisfaction rating for a deployed automation service. In this way, an organization may measure an overall effectiveness level of an automation service that is deployed to service multiple projects within an organization.

Figure 2A:
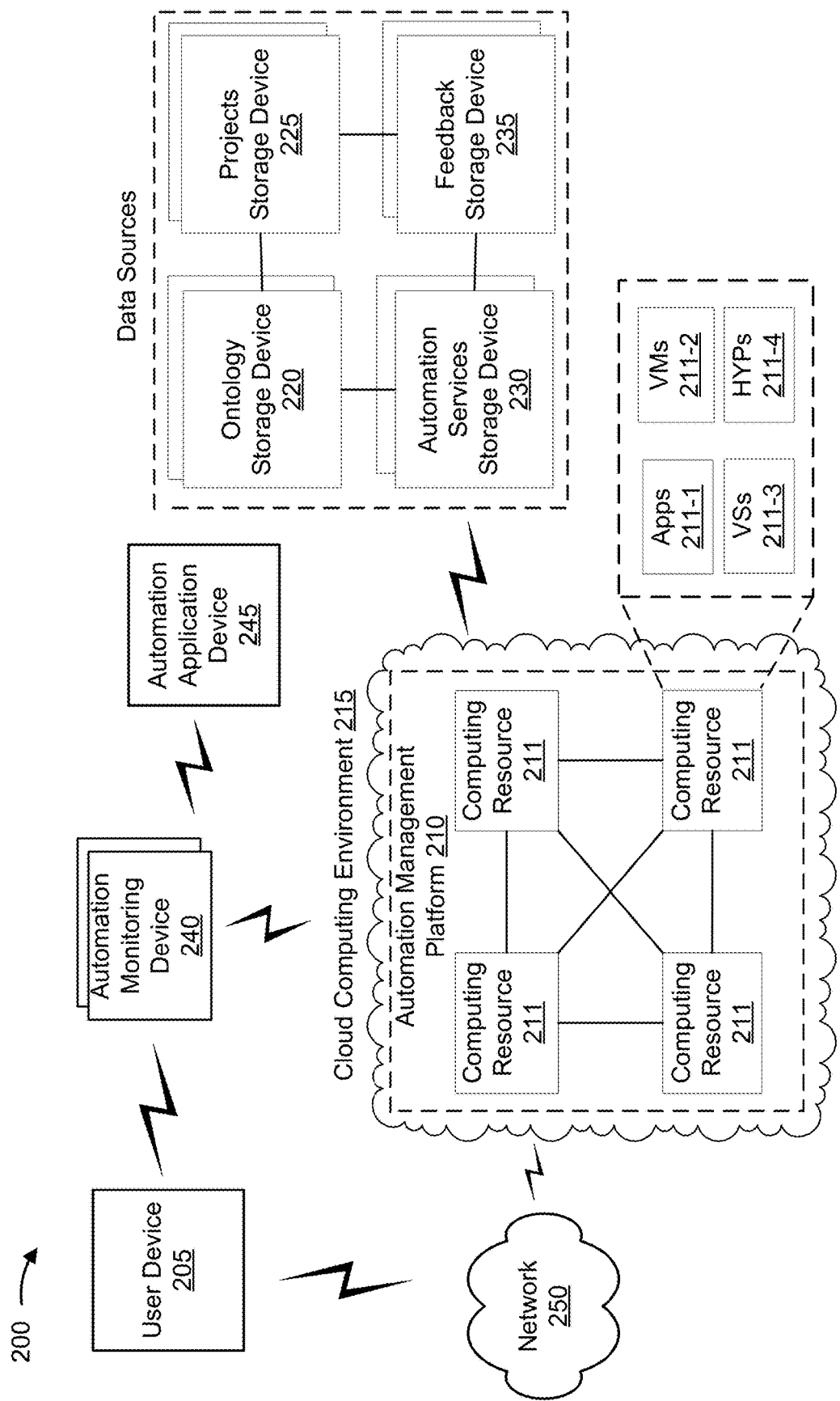

FIG. 2A is a diagram of an example environment 200 in which systems and/or methods, described herein, may be implemented. As shown in FIG. 2A, environment 200 may include user device 205, automation management platform 210 hosted within cloud computing environment 215, ontology storage device 220, projects storage device 225, automation services storage device 230, feedback storage device 235, automation monitoring device 240, automation application device 245, and/or network 250. Devices of environment 200 may interconnect via wired connections, wireless connections, or a combination of wired and wireless connections.

User device 205 includes one or more devices capable of requesting, receiving, storing, processing, and/or providing information associated with an automation service. For example, user device 205 may include a computing device, such as a desktop computer, a laptop computer, a tablet computer, a server device, a mobile phone (e.g., a smart phone or a radiotelephone), a wearable computer (e.g., a smart watch, a smart band, a smart pair of eyeglasses, etc.), a sensor device, or a similar type of device. In some implementations, user device 205 may request and receive an automation service from automation management platform 210. In some implementations, user device 205 may deploy an automation service, and may provide, to automation management platform 210, assessment information and/or feedback information associated with the deployed automation service. In some implementations, user device 205 may receive a recommendation to update the deployed automation service or to deploy another automation service.

Automation management platform 210 includes one or more devices capable of receiving, storing, generating, processing, and/or providing information associated with an automation service. For example, automation management platform 210 may include a cloud server device or a group of cloud server devices. In some implementations, automation management platform 210 may receive a request for an automation service, may perform one or more processing actions to generate a recommendation, and may provide the recommendation to user device 205, automation application device 245, a device associated with a project manager, a device associated with a technical support team, and/or the like.

In some implementations, as shown, automation management platform 210 may be hosted in cloud computing environment 215. Notably, while implementations described herein describe automation management platform 210 as being hosted in cloud computing environment 215, in some implementations, automation management platform 210 may not be cloud-based (i.e., may be implemented outside of a cloud computing environment) or may be partially cloud-based.

Cloud computing environment 215 includes an environment that hosts automation management platform 210. Cloud computing environment 215 may provide computation, software, data access, storage, and/or other services that do not require end-user knowledge of a physical location and configuration of system(s) and/or device(s) that host automation management platform 210. As shown, cloud computing environment 215 may include a group of computing resources 211 (referred to collectively as "computing resources 211" and individually as "computing resource 211").

Computing resource 211 includes one or more personal computers, workstation computers, server devices, or another type of computation and/or communication device. In some implementations, computing resource 211 may host automation management platform 210. The cloud resources may include compute instances executing in computing resource 211, storage devices provided in computing resource 211, data transfer devices provided by computing resource 211, etc. In some implementations, computing resource 211 may communicate with other computing resources 211 via wired connections, wireless connections, or a combination of wired and wireless connections.

As further shown in FIG. 2A, computing resource 211 may include a group of cloud resources, such as one or more applications ("APPs") 211-1, one or more virtual machines ("VMs") 211-2, virtualized storage ("VSs") 211-3, one or more hypervisors ("HYPs") 211-4, and/or the like.

Application 211-1 includes one or more software applications that may be provided to or accessed by user device 205 and/or automation application device 245. Application 211-1 may eliminate a need to install and execute the software applications on user device 205 and/or automation application device 245. For example, application 211-1 may include software associated with automation management platform 210 and/or any other software capable of being provided via cloud computing environment 215. In some implementations, one application 211-1 may transmit/receive information to/from one or more other applications 211-1, via virtual machine 211-2.

Virtual machine 211-2 includes a software implementation of a machine (e.g., a computer) that executes programs like a physical machine. Virtual machine 211-2 may be either a system virtual machine or a process virtual machine, depending upon use and degree of correspondence to any real machine by virtual machine 211-2. A system virtual machine may provide a complete system platform that supports execution of a complete operating system ("OS"). A process virtual machine may execute a single program, and may support a single process. In some implementations, virtual machine 211-2 may execute on behalf of a user, and may manage infrastructure of cloud computing environment 215, such as data management, synchronization, or long-duration data transfers.

Virtualized storage 211-3 includes one or more storage systems and/or one or more devices that use virtualization techniques within the storage systems or devices of computing resource 211. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 211-4 provides hardware virtualization techniques that allow multiple operating systems (e.g., "guest operating systems") to execute concurrently on a host computer, such as computing resource 211. Hypervisor 211-4 may present a virtual operating platform to the guest operating systems, and may manage the execution of the guest operating systems. Multiple instances of a variety of operating systems may share virtualized hardware resources.

Ontology storage device 220 includes one or more devices capable of storing and providing information associated with automation services. For example, ontology storage device 220 may include a server device or a group of server devices. In some implementations, ontology storage device 220 may be associated with a graph data structure that stores information associated with automation services. In some implementations, ontology storage device 220 may receive, from automation management platform 210, a request for information associated with automation services, and may provide the information to automation management platform 210 after receiving the request.

Projects storage device 225 includes one or more devices capable of storing and providing project information. For example, projects storage device 225 may include a server device or a group of server devices. In some implementations, projects storage device 225 may receive, from automation management platform 210, a request for project information for a set of projects, and may provide the project information to automation management platform 210 after receiving the request.

Automation services storage device 230 includes one or more devices capable of storing and providing information associated with automation services. For example, automation services storage device 230 may include a server device or a group of server devices. In some implementations, automation services storage device 230 may receive, from automation management platform 210, a request for automation services information for a set of automation services, and may provide the automation services information to automation management platform 210 after receiving the request.

Feedback storage device 235 includes one or more devices capable of storing and providing feedback information. For example, feedback storage device 235 may include a server device or a group of server devices. In some implementations, feedback storage device 235 may store a graph data structure. In some implementations, feedback storage device 235 may receive feedback information (e.g., node values and/or edge values) from automation management platform 210, may use the feedback information to generate a recommendation, and may provide the recommendation to automation management platform 210.

In some implementations, ontology storage device 220, projects storage device 225, automation services storage device 230, and/or feedback storage device 235 may store automation service identifiers. In this way, information for an automation service may be stored in one or more data sources. While ontology storage device 220, projects storage device 225, automation services storage device 230, and feedback storage device 235 are shown as separate storage devices, in some implementations, two or more of these storage devices may be combined and/or implemented as a single storage device.

Automation monitoring device 240 includes one or more devices capable of monitoring, storing, processing, and/or providing assessment information. For example, automation monitoring device 240 may include a sensor, a camera, a device capable of monitoring one or more metrics relating to an automation application, and/or any other device capable of monitoring assessment information. In some implementations, automation monitoring device 240 may monitor a deployed automation service to obtain assessment information. In some implementations, automation monitoring device 240 may provide the assessment information to automation management platform 210. In some implementations, one or more or all of the functions of automation monitoring device 240 may be implemented by user device 205 and/or automation application device 245.

Automation application device 245 includes one or more devices capable of receiving, storing, deploying, processing, and/or providing information associated with an automation service. For example, automation application device 245 may include a computing device, such as a desktop computer, a laptop computer, a tablet computer, a server device, a mobile phone (e.g., a smart phone or a radiotelephone), a wearable computer (e.g., a smart watch, a smart band, a smart pair of eyeglasses, etc.), a sensor device, or a similar type of device. In some implementations, automation application device 245 may receive, from automation management platform 210, an automation service. In this case, automation application device 245 may deploy the automation service.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

FIG. 2B is a diagram of example functional modules of automation management platform 210. As shown in FIG. 2B, automation management platform 210 may include a recommendation module 212, a continuous assessment module 213, and/or a feedback module 214. In some implementations, one or more modules may be implemented as part of automation management platform 210. The functional modules of automation management platform 210 may be implemented in hardware, software executing on hardware, and/or firmware.

Recommendation module 212 operates on one or more computing resources and is associated with recommending an automation service. In some implementations, recommendation module 212 may receive a request for an automation service. In some implementations, recommendation module 212 may analyze the request using natural language processing submodule 212-1, may obtain and analyze information associated with automation services using ontology processing submodule 212-2, and/or may obtain and analyze project information and/or automation services information using similarity analysis submodule 212-3. In some implementations, recommendation module 212 may generate a recommendation for an automation service, and may provide the recommendation to user device 205 and/or automation application device 245.

In some implementations, recommendation module 212 may receive, from continuous assessment module 213, a query that is associated with a deployed automation service. In this case, recommendation module 212 may generate a recommendation to update a deployed automation service, to deploy another automation service, and/or the like. Additionally, recommendation module 212 may provide the recommendation to user device 205, automation application device 245, to a device associated with a project manager, to a device associated with a technical support team, and/or the like.

In some implementations, natural language processing submodule 212-1 may analyze a request for an automation service. For example, natural language processing submodule 212-1 may analyze a request for an automation service using a natural language processing technique. In some implementations, natural language processing submodule 212-1 may tag words associated with the request with parts of speech indicators, may parse the tagged words, may identify one or more input keywords (i.e., tagged nouns and verbs associated with the request), may remove one or more stop words associated with the request, and/or the like. In some implementations, natural language processing submodule 212-1 may, in addition to identifying input keywords, identify key phrases. In some implementations, natural language processing submodule 212-1 may provide the one or more input keywords to ontology processing submodule 212-2.

In some implementations, ontology processing submodule 212-2 may obtain and analyze information associated with automation services. For example, ontology processing submodule 212-2 may use the input keywords associated with the request to query ontology storage device 220 to obtain information associated with automation services. In some implementations, ontology processing submodule 212-2 may identify a set of candidate automation services by using one or more similarity analysis techniques (e.g., a lexical similarity analysis technique, a semantic similarity analysis technique, etc.) to analyze the information associated with automation services. In some implementations, ontology processing submodule 212-2 may provide the set of candidate automation services to similarity analysis submodule 212-3 for further processing.

Additionally, or alternatively, similarity analysis submodule 212-3 may obtain and analyze project information and/or automation services information. For example, similarity analysis submodule 212-3 may use the set of candidate automation services to query projects storage device 225 to obtain project information and/or to query automation services storage device 230 to obtain automation services information. In some implementations, similarity analysis submodule 212-3 may analyze the project information and/or the automation services information by performing a similarity analysis technique, such as a cosine similarity analysis technique, a Boolean similarity analysis technique, a binary match similarity analysis technique, a Jaccard similarity analysis technique, a Euclidean similarity analysis technique, and/or the like. In some implementations, similarity analysis submodule 212-3 may assign scores to automation services and may recommend an automation service with a highest available score.

Continuous assessment module 213 operates on one or more computing resources and is associated with monitoring a deployed automation service and recommending an alternative automation service. For example, continuous assessment module 213 may receive assessment information from automation monitoring device 240, and may recommend an alternative automation service using automation rules submodule 213-1, query generator submodule 213-2, and/or notification generator submodule 213-3.

In some implementations, automation rules submodule 213-1 may analyze assessment information. For example, automation rules submodule 213-1 may analyze one or more metrics included in the assessment information to determine whether the one or more metrics satisfy a threshold. In some implementations, automation rules submodule 213-1 may determine that a metric satisfies a threshold, which may cause query generator submodule 213-2 and/or notification generator submodule 213-3 to perform one or more actions.

In some implementations, query generator submodule 213-2 may generate a query that recommendation module 212 may use to generate an alternative recommendation. For example, assume query generator submodule 213-2 receives an indication that one or more metrics included in the assessment information satisfy a threshold. In this case, query generator submodule 213-2 may generate a query for recommendation module 212.

In some implementations, notification generator submodule 213-3 may provide a notification to user device 205 and/or automation application device 245. For example, notification generator submodule 213-3 may provide a notification indicating that one or more metrics included in the assessment information satisfy a threshold, that an alternative automation service is available, and/or the like.

Feedback module 214 operates on one or more computing resources and is associated with processing feedback information associated with a deployed automation service. For example, feedback module 214 may receive, process, and/or provide feedback information using feedback processing submodule 214-1, structured feedback analyzer submodule 214-2, free-form feedback analyzer submodule 214-3, and/or feedback generator submodule 214-4. Additionally, or alternatively, feedback module 214 may determine an organizational-level satisfaction rating of a deployed automation service using scoring submodule 214-5, investment analysis submodule 214-6, deployment analyzer submodule 214-7, and/or satisfaction determination submodule 214-8.

In some implementations, feedback processing submodule 214-1 may analyze feedback information. For example, feedback processing submodule 214-1 may analyze feedback information to classify the feedback information into an input type (e.g., structured feedback, free-form feedback, etc.). In some implementations, feedback processing submodule 214-1 may receive, from user device 205 and/or automation application device 245, feedback information associated with a deployed automation service. In this case, feedback processing submodule 214-1 may analyze the feedback information to classify the feedback information, and may provide the feedback information to structured feedback analyzer submodule 214-2 or free-form feedback analyzer submodule 214-3 based on the classification.

In some implementations, structured feedback analyzer submodule 214-2 may analyze the structured feedback information. For example, structured feedback analyzer submodule 214-2 may analyze the structured feedback information to identify a feedback category, one or more feedback constraints, and/or one or more constraint indicators. In some implementations, structured feedback analyzer submodule 214-2 may identify a feedback category, one or more feedback constraints, and/or one or more constraint indicators, and may provide the feedback category, the one or more feedback constraints, and/or the one or more constraint indicators to feedback generator submodule 214-4.

In some implementations, free-form feedback analyzer submodule 214-3 may analyze the free-form feedback information. For example, free-form feedback analyzer submodule 214-3 may analyze the free-form feedback information to identify a feedback category, one or more feedback constraints, and/or one or more constraint indicators. In some implementations, free-form feedback analyzer submodule 214-3 may analyze the free-form feedback information using one or more natural language processing operations, as described elsewhere herein. In some implementations, free-form feedback analyzer submodule 214-3 may identify a feedback category, one or more feedback constraints, and/or one or more constraint indicators, and may provide the feedback category, the one or more feedback constraints, and/or the one or more constraint indicators to feedback generator submodule 214-4.

In some implementations, feedback generator submodule 214-4 may generate an entry for a data structure associated with feedback storage device 235. For example, feedback generator submodule 214-4 may use the feedback information to generate nodes and/or edges for a graph data structure. In some implementations, prior to storing node values and/or edge values associated with the feedback information, feedback generator submodule 214-4 may determine whether the feedback information is already included in the graph data structure, thereby conserving memory resources of feedback storage device 235.

In some implementations, feedback module 214 may determine an organizational-level satisfaction rating of a deployed automation service using scoring submodule 214-5, an investment analysis submodule 214-6, a deployment analyzer submodule 214-7, and/or a satisfaction determination submodule 214-8.

In some implementations, scoring submodule 214-5 may analyze feedback information to determine scores (e.g., sentiment scores). For example, assume one or more projects in an organization deploy an automation service. Further assume that during the deployments, feedback module 214 receives feedback information associated with the deployed automation service. In this case, scoring submodule 214-5 may analyze the feedback information to determine scores that may be used as part of determining an organization-level satisfaction rating. Additionally, scoring submodule 214-5 may determine an overall score for the deployed automation service and a maximum score associated with other automation services used by the organization. In some implementations, a third party service may perform the scoring, scoring submodule 214-5 may receive the scores, and scoring submodule 214-5 may analyze the scores to determine a maximum overall score for the deployed automation service and a maximum score associated with other automation services used by the organization.

In some implementations, investment analysis submodule 214-6 may determine one or more values that may be used in determining an organizational-level satisfaction rating. For example, investment analysis submodule 214-6 may determine a total savings amount for the automation service and/or a total investment amount for the automation service. In some implementations, investment analysis submodule 214-6 may query one or more data sources (e.g., ontology storage device 220, projects storage device 225, automation services storage device 230, feedback storage device 235, etc.) to determine a total savings amount for the automation service and/or a total investment amount for the automation service.

In some implementations, deployment analyzer submodule 214-7 may determine deployment information that may be used in determining an organizational-level satisfaction rating. For example, deployment analyzer submodule 214-7 may determine a number of deployments for an automation service and a number of eligible projects that are capable of using the deployed automation service. In some implementations, deployment analyzer submodule 214-7 may search a data source (e.g., automation services storage device 230) to determine a number of deployments for an automation service. In some implementations, deployment analyzer submodule 214-7 may perform a similarity analysis on projects that are using the deployed automation service to determine similarity scores for the projects. In some implementations, deployment analyzer submodule 214-7 may perform a similarity analysis on additional projects that are capable of using the deployed automation service, and may select an additional project if the additional project satisfies a threshold.

In some implementations, satisfaction determination submodule 214-8 may determine an organizational-level satisfaction rating. For example, satisfaction determination submodule 214-8 may process an overall automation service rating for a deployed automation service, a maximum automation service rating for other automation services used by an organization, an overall score (e.g., an overall sentiment score) associated with feedback information relating to the deployed automation service, a maximum score associated with feedback information relating to other automation services used by the organization, a total savings amount, a total investment amount, a number of deployments associated with the deployed automation service, a number of projects capable of using the deployed automation service, and/or the like to determine an organizational-level satisfaction rating. In some implementations, satisfaction determination submodule 214-8 may analyze the organizational-level satisfaction rating and may perform one or more actions associated with improving performance of the deployed automation service or one or more actions associated with deploying another automation service.

The number and arrangement of functional modules and/or submodules shown in FIG. 2B are provided as an example. In practice, there may be additional functional modules and/or submodules, fewer functional modules and/or submodules, different functional modules and/or submodules, or differently arranged functional modules and/or submodules than those shown in FIG. 2B. Furthermore, two or more functional modules and/or submodules shown in FIG. 2B may be implemented within a single functional module and/or submodule, or a single functional module and/or submodule shown in FIG. 2B may be implemented as multiple, distributed functional modules and/or submodules. For example, although modules 212-214 are shown as being operated by a single cloud computing environment 215 (e.g., automation management platform 210), module 212 may be operated by a first cloud computing environment 215 (e.g., an automation recommendation platform) and modules 212 and 213 may be operated by a second cloud computing environment 215 (e.g., an automation assessment and feedback platform) that may communicate via an interface, such as an API, a secure interface, and/or the like.

Figure 3:
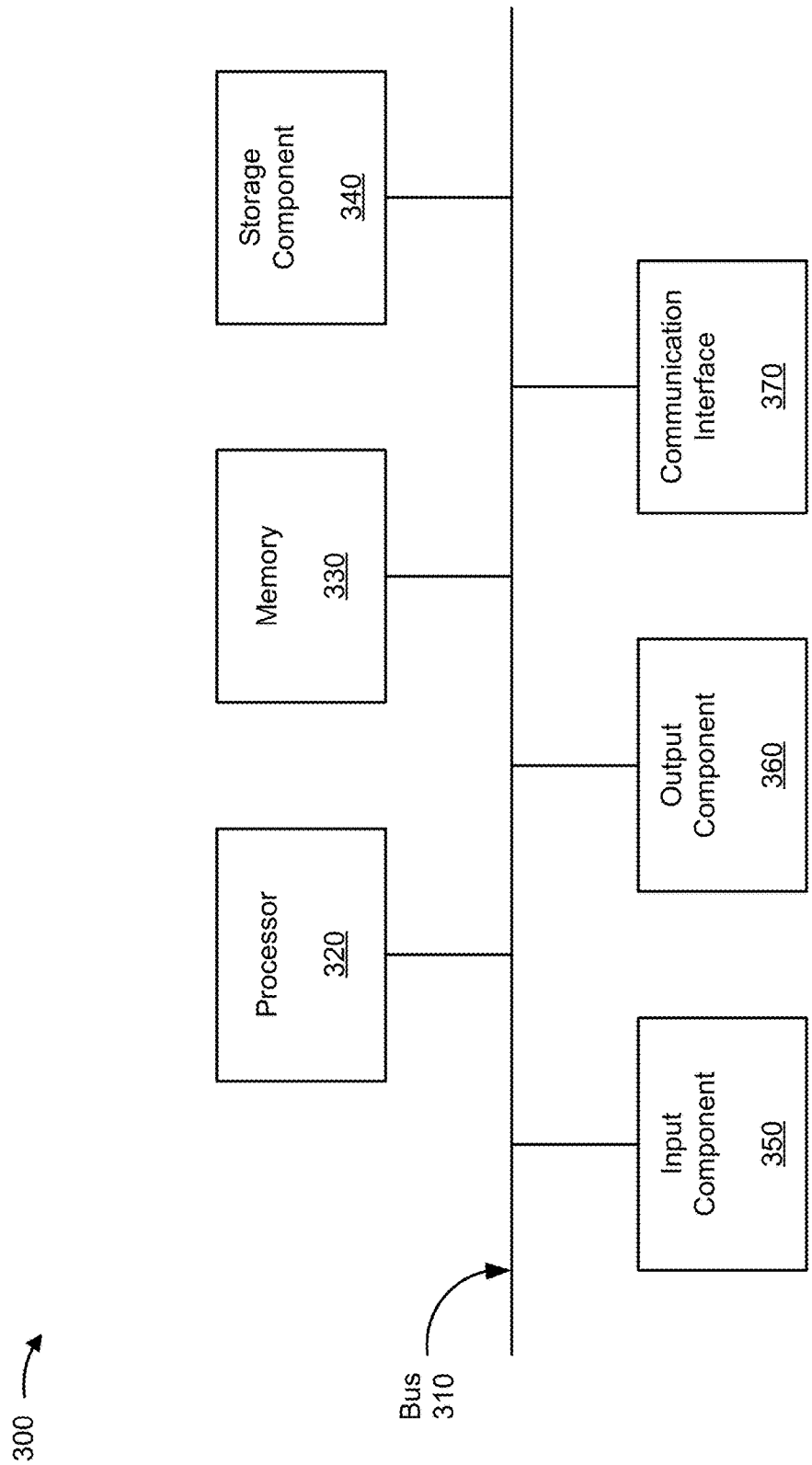
FIG. 3 is a diagram of example components of one or more devices of FIG. 2.

FIG. 3 is a diagram of example components of a device 300. Device 300 may correspond to user device 205, automation management platform 210, ontology storage device 220, projects storage device 225, automation services storage device 230, feedback storage device 235, automation monitoring device 240, and/or automation application device 245. In some implementations, user device 205, automation management platform 210, ontology storage device 220, projects storage device 225, automation services storage device 230, feedback storage device 235, automation monitoring device 240, and/or automation application device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
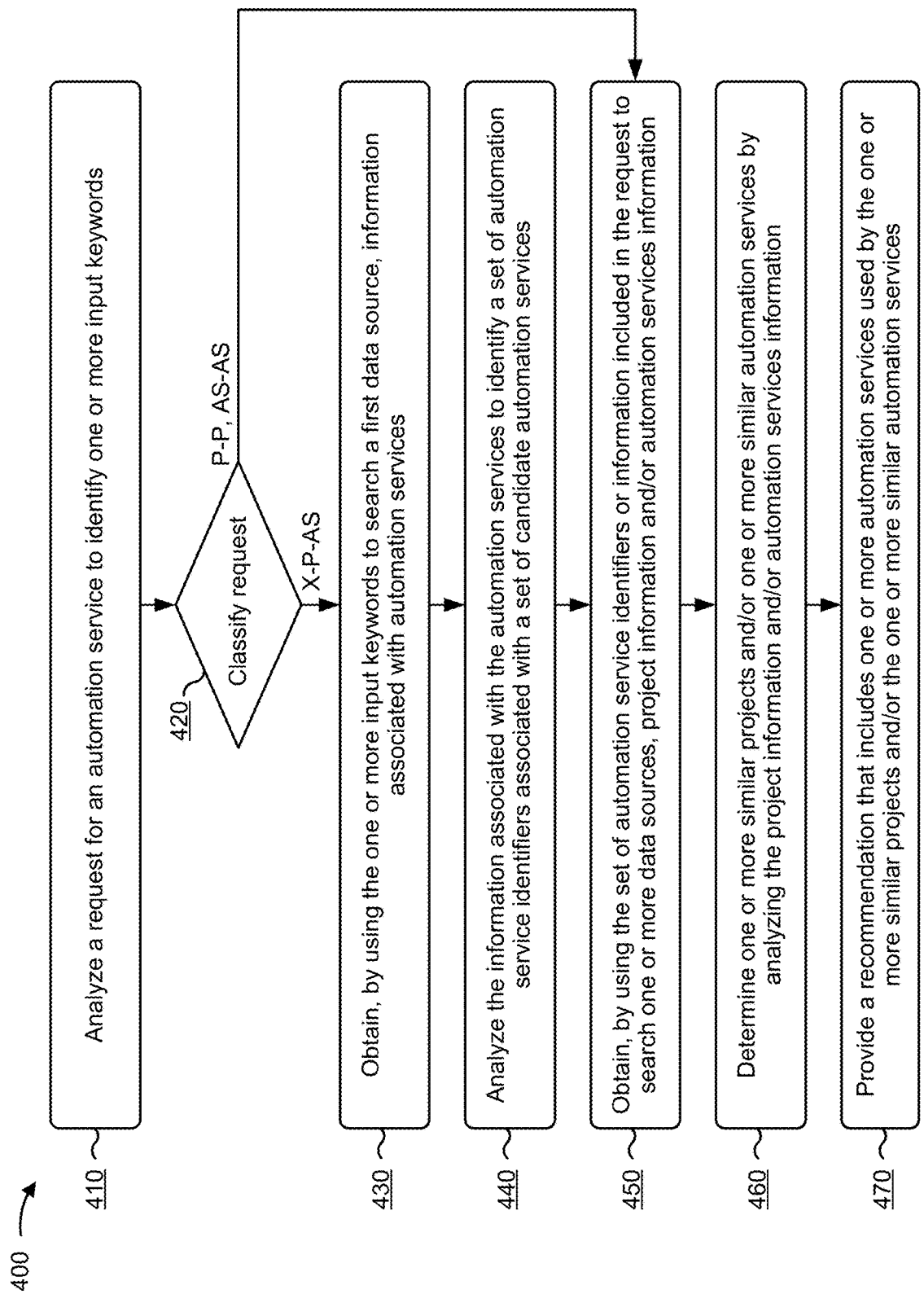
FIG. 4 is a flow chart of an example process for using natural language processing and similarity analysis techniques to recommend a best-fit automation service.

FIG. 4 is a flow chart of an example process 400 for using natural language processing and similarity analysis techniques to recommend a best-fit automation service. In some implementations, one or more process blocks of FIG. 4 may be performed by automation management platform 210. In some implementations, one or more process blocks of FIG. 4 may be performed by another device or a group of devices separate from or including automation management platform 210, such as user device 205, ontology storage device 220, project storage device 225, automation services storage device 230, feedback storage device 235, automation monitoring device 240, and/or automation application device 245.

As shown in FIG. 4, process 400 may include analyzing a request for an automation service to identify one or more input keywords (block 410). For example, automation management platform 210 may receive, from user device 205, a request for an automation service for a project, and may analyze the request to identify one or more input keywords. An input keyword may be a noun, a verb, and/or any word that may be useful in recommending an automation service. A project may include one or more tasks designed to achieve a particular objective. An automation service may be a system or a process for automatically performing one or more tasks of a project. The request may be a request for a particular automation service or may be a request for an automation service without any user knowledge of available automation services. The request may include automation services information from a catalogue of available automation services, information identifying a problem that a user is tasked with solving, a project identifier for a project that a user is working on, and/or the like.

In some implementations, the request may be free-form text. For example, a user may interact with a user interface of user device 205 to input a request into a free-form text box. In some implementations, the request may be a structured request. For example, a user may interact with a user interface of user device 205 to input a request into structured text boxes, may upload a document, such as a document that includes project information, may select one or more automation services from a catalogue of automation services that is viewable via the user interface, and/or the like. In some implementations, the request may be a voice-activated request. For example, a user may speak into a microphone associated with user device 205, and a voice-to-text feature may transcribe the voice-based request into text.

In some implementations, automation management platform 210 may receive a request that includes one or more automation services. For example, a user may interact with a user interface of user device 205 to select an automation service (a first automation service) from a catalogue of available automation services. In this case, the user may be requesting one or more automation services that are similar to the one or more selected automation services.

In some implementations, automation management platform 210 may receive a request from a user that is tasked with solving a particular problem. For example, automation management platform 210 may receive a free-form request from a user that identifies a problem that the user is tasked with solving. In this way, automation management platform 210 is able to process requests without user knowledge of available automation services.

In some implementations, automation management platform 210 may receive a request from a user that is working on a project to identify similar projects and/or automation services that are associated with the similar projects. For example, automation management platform 210 may receive a request that includes a project identifier for a project. In this way, automation management platform 210 may use the project identifier to access project information for the project, and may analyze the project information to identify a best-fit automation service.

In some implementations, automation management platform 210 may analyze the request using a natural language processing technique. For example, automation management platform 210 may use a natural language processing technique to identify one or more keywords that may be further processed to identify a best-fit automation service. The natural language processing technique may include a tokenization technique, a lexical analysis technique, an occurrence counting technique, a technique to reduce or eliminate stop words (e.g., a word that occurs frequently in text and may waste processing resources to analyze), a stemming technique (e.g., reducing an inflected word to the word stem to conserve processing resources), a lemmatization technique, an additive smoothing technique, and/or the like.

As an example, assume automation management platform 210 receives a free-form text request, such as a request for an automation service to reduce agent effort in duplicate ticket resolution. In this case, automation management platform 210 may identify one or more input keywords by assigning parts of speech tags to one or more words associated with the request. Here, automation management platform 210 may identify one or more nouns and/or verbs associated with the request based on the parts of speech tags, and may use the nouns and/or verbs as the one or more input keywords.

In this way, automation management platform 210 may identify one or more input keywords that may be further analyzed to identify a best-fit automation service.

As further shown in FIG. 4, process 400 may include classifying the request into a null-to-project-to-automation service (X-P-AS) class, a project-to-project (P-P) class, or an automation service-to-automation service (AS-AS) class (block 420). For example, automation management platform 210 may classify the request into an X-P-AS class (a first class), a P-P class (a second class), or an AS-AS class (a third class) to determine which processing actions to apply to the request. In some implementations, automation management platform 210 may classify the request by determining whether the request includes a project identifier for a project, whether the request includes automation services information for automation services that are selected from a catalogue, or whether the request includes neither a project identifier for a project nor automation services information. In some implementations, automation management platform 210 may use a different trigger to classify the request (e.g., by identifying whether the request is a free-form request or a structured request).

In some implementations, automation management platform 210 may classify the request into a P-P class or into an A-A class. For example, if the request includes a project identifier for a project, then automation management platform 210 may classify the request into a P-P class. If the request includes automation services information for automation services that are selected from a catalogue, then automation management platform 210 may classify the request into an AS-AS request. If the request is classified into a P-P class or an AS-AS class (block 420—P-P, AS-AS), then process 400 may proceed to block 450.

In some implementations, automation management platform 210 may classify the request into an X-P-AS class. For example, if the request does not include project information or automation services information (e.g., a request indicating a problem that a user is tasked with solving), then automation management platform 210 may need to perform additional processing to identify a best-fit automation service, and may classify the request into an X-P-AS class.

If the request is classified into an X-P-AS class (block 420—X-P-AS), then process 400 may include obtaining, by using the one or more input keywords to search a first data source, information associated with automation services (block 430). For example, automation management platform 210 may use the one or more input keywords to search ontology storage device 220 for information associated with automation services.

The information associated with the automation services may include information indicating one or more automation domains, one or more automation purposes, one or more automation constraints, one or more automation levers, one or more automation services, one or more nouns and/or verbs relating to one or more automation service identifiers, one or more synonyms of the nouns and/or the verbs, and/or the like. An automation domain may indicate a category that includes a particular type of automation service. An automation purpose may indicate a purpose with which one or more automation services may serve. An automation constraint may identify an issue associated with the automation purpose (e.g., an issue relating to quality, productivity, technology, etc.). An automation lever may indicate a solution to an automation purpose or to an automation constraint (e.g., a solution relating to productivity, a solution relating to quality, etc.). An automation service may be a system or a process for executing one or more tasks associated with a project, and may store an automation service identifier as metadata. A noun and/or a verb may describe properties or characteristics of an automation purpose, an automation lever, an automation constraint, an automation service, and/or the like.

In some implementations, ontology storage device 220 may store the information associated with the automation services using a graph data structure. For example, ontology storage device 220 may store the information using a graph data structure that includes a set of nodes and a set of edges. In some cases, a graph data structure may use an automation domain as a root node, and the automation domain may be associated with a set of nodes relating to automation purposes, automation levers, automation constraints, automation service identifiers, nouns and/or verbs relating to the automation services, and/or the like. In some implementations, ontology storage device 220 may store the information using a different data structure, such as a linked-list, an array, a hash table, a tree, and/or the like.

In some implementations, ontology storage device 220 may store large quantities of data. For example, ontology storage device 220 may use a graph data structure that includes thousands, tens of thousands, hundreds of thousands, or even millions (or more) of nodes and edges. As an example, while implementations described herein describe automated services relating to an application maintenance domain, the graph data structure may store automated services relating to other domains, such as an application design domain, a project management domain, a business analytics domain, a customer service domain, and/or the like. In this way, ontology storage device 220 is able to store large quantities of data that automation management platform 210 may query for processing. Additionally, the large quantities of data may be such that a human operator or an inferior automation management service may be objectively unable to analyze or process.

In some implementations, automation management platform 210 may obtain information associated with one or more automation levers. For example, automation management platform 210 may use the one or more input keywords (e.g., one or more nouns and/or verbs) to search a graph data structure for one or more matching nouns and/or verbs, and may identify one or more automation levers associated with the matching nouns and/or verbs. In this case, automation management platform 210 may obtain all (or some) nodes associated with the automation levers, such as automation domain nodes, automation constraint nodes, automation service identifier nodes, matching noun and/or verb nodes, and/or the like. By obtaining information associated with automation levers that match the one or more input keywords, automation management platform 210 conserves processing resources relative to obtaining information associated with all automation levers included in the graph data structure.

By obtaining information associated with automation services, automation management platform 210 may perform further processing to identify a best-fit automation service.

As further shown in FIG. 4, process 400 may include analyzing the information associated with the automation services to identify a set of automation service identifiers associated with a set of candidate automation services (block 440). For example, automation management platform 210 may analyze information associated with the automation services with a similarity analysis technique. In this case, the similarity analysis technique may be used to identify a set of automation service identifiers associated with a set of candidate automation services. A similarity analysis technique may include a lexical analysis technique, a semantic analysis technique, and/or the like.

In some implementations, automation management platform 210 may use a similarity analysis technique to determine one or more similarity scores for one or more nouns and/or verbs included in the graph data structure. For example, automation management platform 210 may, for each verb and/or noun, determine a lexical similarity score and/or a semantic similarity score by comparing the one or more nouns and/or verbs and the one or more input keywords. As an example, automation management platform 210 may use a Jaro Winkler similarity analysis to determine a lexical similarity between the one or more nouns and one or more verbs associated with the request and the one or more nouns and/or verbs included in the graph data structure. Additionally, automation management platform 210 may use a Lin similarity analysis to determine a semantic similarity between the one or more nouns and one or more verbs associated with the request and the one or more nouns and/or verbs included in the graph data structure. Because the one or more nouns and/or verbs are associated with particular automation levers, automation management platform 210 may use the scores to determine overall similarity scores for automation levers.

Additionally, automation management platform 210 may determine overall similarity scores for one or more automation levers. For example, assume automation management platform 210 determines lexical and/or semantic similarity scores for one or more nouns and/or verbs associated with an automation lever. In this case, automation management platform 210 may determine an overall similarity score for the automation lever by determining an average similarity score for the one or more nouns and/or verbs associated with the automation lever. Additionally, automation management platform 210 may determine overall similarity scores for one or more automation levers to identify an automation lever associated with a highest overall similarity score.

Additionally, automation management platform 210 may identify an automation lever with a highest overall similarity score, and identify an automation purpose associated with the automation lever with the highest overall similarity score. In this case, automation management platform 210 may use automation services associated with the identified automation purpose as the set of candidate automation services.

In some implementations, automation management platform 210 may use a different parameter when identifying automation services as the set of candidate automation services. As an example, automation management platform 210 may identify an automation lever with a highest overall similarity score, and may use automation services associated with the automation lever as the set of candidate automation services (e.g., instead of using automation services associated with the automation purpose).

By identifying a set of candidate automation services, automation management platform 210 is able to search additional data sources to identify project information and/or automation services information that may be processed to identify a best-fit automation service.

As further shown in FIG. 4, process 400 may include obtaining, by using the set of automation service identifiers or information included in the request to search one or more data sources, project information and/or automation services information (block 450). For example, automation management platform 210 may obtain project information for a set of projects from a second data source (e.g., projects storage device 225) and/or may obtain automation services information for a set of automation services from a third data source (e.g., automation services storage device 230). Project information may include a set of project characteristics that identify administrative information for a project, information relating to the one or more tasks of a project, information relating to project expectations, information relating to automation services for a project, and/or the like. Automation services information may include a set of automation service characteristics that identify administrative information for an automation service, information relating to functions or features of an automation service, information relating projects to which the automation service is being applied, information relating to rating an automation service, and/or the like. In some implementations, automation management platform 210 may determine whether to obtain project information and/or automation services information based on the input classification of the request (e.g., whether the request is classified into a P-P class, an AS-AS class, an X-P-AS class, etc.).

In some implementations, automation management platform 210 may obtain project information for a set of project characteristics. For example, automation management platform 210 may search a data structure associated with projects storage device 225 to obtain project information that includes a set of project characteristics. The set of project characteristics may include a project identifier, a project name, a project duration, a geographic region associated with a project, a project industry, a project technology area, one or more names of parties associated with the project, project parameters indicating particular details about the project tasks (e.g., system requirements to carry out the project, such as operating system requirements for hardware involved with the project, etc.), automation service identifiers for automation services used for a project, and/or the like.

In some implementations, automation management platform 210 may obtain project information based on classifying the request into a P-P class. For example, assume automation management platform 210 receives a request that includes a project identifier for a project that a user is working on, and that automation management platform 210 classifies the request into a P-P class. In this case, automation management platform 210 may use the project identifier as input to search a data structure associated with projects storage device 225 to obtain project information for the project.

Additionally, automation management platform 210 may obtain project information for additional projects that may be used in a similarity analysis with the project information for the project, as described further herein. In some cases, automation management platform 210 may apply a filter when obtaining the project information for the additional projects. As an example, a filter may allow automation management platform 210 to search for projects with project characteristics that match the project characteristics of the project, thereby conserving processing resources relative to obtaining project information for all projects.

In some implementations, automation management platform 210 may obtain automation services information for a set of automation services. For example, automation management platform 210 may search a data structure associated with automation services storage device 230 to obtain automation services information that includes a set of automation service characteristics. The set of automation service characteristics may include an automation service identifier, an automation service name, an automation service description, an automation service rating (e.g., an individual user rating, an overall rating, etc.), one or more names of individuals associated with developing the automation service, a cost associated with developing the automation service, a cost associated with maintaining the automation service, one or more metrics associated with data usage of an automation service, and/or the like.

In some implementations, automation management platform 210 may obtain automation services information based on classifying the request into an AS-AS class. For example, assume automation management platform 210 receives a request associated with a user selecting one or more automation services from a catalogue, and that automation management platform 210 classifies the request into an AS-AS request. In this case, automation management platform 210 may use one or more automation service identifiers as input to search a data structure associated with automation services storage device 230 to obtain automation services information for the user-selected automation services.

Additionally, automation management platform 210 may obtain automation services information for additional automation services that may be used in a similarity analysis with the automation services information for the user-selected automation services. In some cases, automation management platform 210 may apply a filter when obtaining the automation services information for the additional automation services.

In some implementations, automation management platform 210 may obtain project information and/or automation services information based on classifying the request into an X-P-AS class. For example, assume automation management platform 210 receives a request that includes free-form text describing a problem that a user is tasked with solving, and that automation management platform 210 classifies the request into an X-P-AS class. In this case, automation management platform 210 may identify a set of candidate automation services, as described above, and may use the set of automation service identifiers associated with the set of candidate automation services to obtain project information for projects that use the set of candidate automation services.

Additionally, automation management platform 210 may obtain project information for additional projects. For example, automation management platform 210 may use project characteristics for the projects that use the set of candidate automation services to obtain project information for additional projects. In this way, automation management platform 210 may perform a similarity analysis on the project information and the additional project information to determine one or more similar projects, as described further herein.

By obtaining project information and/or automation services information, automation management platform 210 may process the information to determine similar projects and/or automation services that may be used to identify a best-fit automation service.

As further shown in FIG. 4, process 400 may include determining one or more similar projects and/or one or more similar automation services by analyzing the project information and/or the automation service information (block 460). For example, automation management platform 210 may use one or more similarity analysis techniques to determine similarity scores for projects associated with the project information and/or similarity scores for the automation services associated with the automation services information. A similarity analysis technique may include a Cosine similarity analysis technique, a Boolean or binary match technique, a Jaccard similarity analysis technique, a Euclidean similarity analysis technique, and/or the like. In some implementations, automation management platform 210 may select one or more similarity analysis techniques based on data types, and may perform the one or more similarity analysis techniques to determine the one or more similar projects and/or the one or more similar automation services.

In some implementations, automation management platform 210 may select one or more similarity analysis techniques. For example, automation management platform 210 may analyze data types of the project characteristics associated with the project information and/or data types of the automation service characteristics associated with the automation services information, and may select one or more similarity analysis techniques based on the data types. A data type may be a string data type, an integer data type, a Boolean data type, and/or the like.

As an example, project information for a project may include a project characteristic with a Boolean data type, and project information for the additional projects may include the same project characteristic with the Boolean data type. In this case, automation management platform 210 may select a Boolean match technique for analyzing the project characteristics with the Boolean data type.

In some implementations, automation management platform 210 may determine one or more similar projects. For example, automation management platform 210 may perform one or more similarity analysis techniques to determine one or more similarity scores between a first set of project characteristics associated with a project and a second set of projects characteristics associated with an additional project. In this case, automation management platform 210 may determine an overall similarity score for the additional project (e.g., by determining an average of the one or more similarity scores). If the overall similarity score for the additional project satisfies a threshold level of similarity with the project, then automation management platform 210 may identify the additional project as a similar project. This analysis may be executed for each of the obtained additional projects.

In some implementations, automation management platform 210 may determine one or more similar automation services. For example, automation management platform 210 may perform one or more similarity analysis techniques to determine one or more similarity scores between a first set of automation service characteristics associated with the user-selected automation service and a second set of automation service characteristics associated with an additional automation service. In this case, automation management platform 210 may determine an overall similarity score for the additional automation service. If the overall similarity score for the additional automation service satisfies a threshold level of similarity with the user-selected automation service, then automation management platform 210 may identify the additional automation service as a similar automation service. This analysis may be executed for each of the obtained additional automation services.

In some implementations, automation management platform 210 may determine one or more similar projects and/or one or more similar automation services. For example, automation management platform 210 may perform one or more similarity analysis techniques to determine one or more similarity scores between a first set of project characteristics associated with projects that use candidate automation services and a second set of automation service characteristics associated with an additional project. In this case, automation management platform 210 may determine an overall similarity score for the additional project. If the overall similarity score for the additional project satisfies a threshold level of similarity with the project that uses the candidate automation service, then automation management platform 210 may identify the additional project as a similar project. This analysis may be executed for each of the additional projects. Additionally, automation management platform may, for each of the similar projects, obtain automation services information for automation services used by the similar projects.

In some implementations, automation management platform 210 may rank the one or more similar projects and/or the one or more similar automation services. For example, automation management platform 210 may rank the one or more similar projects and/or the one or more similar automation services by the overall similarity scores. In this way, automation management platform 210 may use the highest similarity score, a similarity score that satisfies a threshold, or a similarity score that is greater than the next highest similarity score by at least a threshold amount, and/or the like as a best-fit automation service.

By determining one or more similar projects and/or one or more similar automation services, automation management platform 210 is able to recommend a best-fit automation service.

As further shown in FIG. 4, process 400 may include providing a recommendation that includes one or more automation services used by the one or more similar projects and/or the one or more similar automation services (block 470). For example, automation management platform 210 may generate a recommendation to use one or more automation services used by the one or more similar projects and/or the one or more similar automation services. In this case, automation management platform 210 may provide the recommendation to user device 205, automation application device 245, and/or the like.

In some implementations, automation management platform 210 may generate a recommendation. For example, assume the request is classified into a P-P class. In this case, automation management platform 210 may generate a recommendation that identifies one or more automation services used by the one or more similar projects. As another example, assume the request is classified into an AS-AS class. In this case, automation management platform 210 may generate a recommendation that identifies the one or more similar automation services. As another example, assume the request is classified into an X-P-AS class. In this case, automation management platform 210 may generate a recommendation that identifies one or more automation services used by the one or more similar projects and/or the one or more similar automation services.

In some implementations, automation management platform 210 may generate a recommendation that identifies the one or more similar projects and/or the one or more similar automation services. In some implementations, automation management platform 210 may generate a recommendation that identifies a similar project and/or a similar automation service with a highest similarity score. In some implementations, automation management platform 210 may generate a recommendation that identifies the set of candidate automation services.

In some implementations, automation management platform 210 may cause the recommendation to be automatically implemented. For example, automation management platform 210 may access one or more APIs to automatically install and deploy a recommended automation service. In some cases, automation management platform 210 may automatically implement a recommended automation service if the recommended automation service satisfies a threshold similarity score.

By generating a recommendation that includes one or more automation services used by the one or more similar projects and/or the one or more similar automation services, automation management platform 210 ensures that a user is able to deploy a best-fit automation service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By using natural language processing and similarity analysis techniques to identify one or more recommended automation services, automation management platform 210 is able to provide a novice user (i.e., a user without knowledge of available automation services) with a best-fit automation service. Additionally, by analyzing a single query to select a best-fit automation service, automation management platform 210 conserves processing resources relative to an automation tool that selects an inefficient or improper automation service, and that has to perform one or more additional searches to select another automation service to identify the best-fit automation service.

Figure 5:
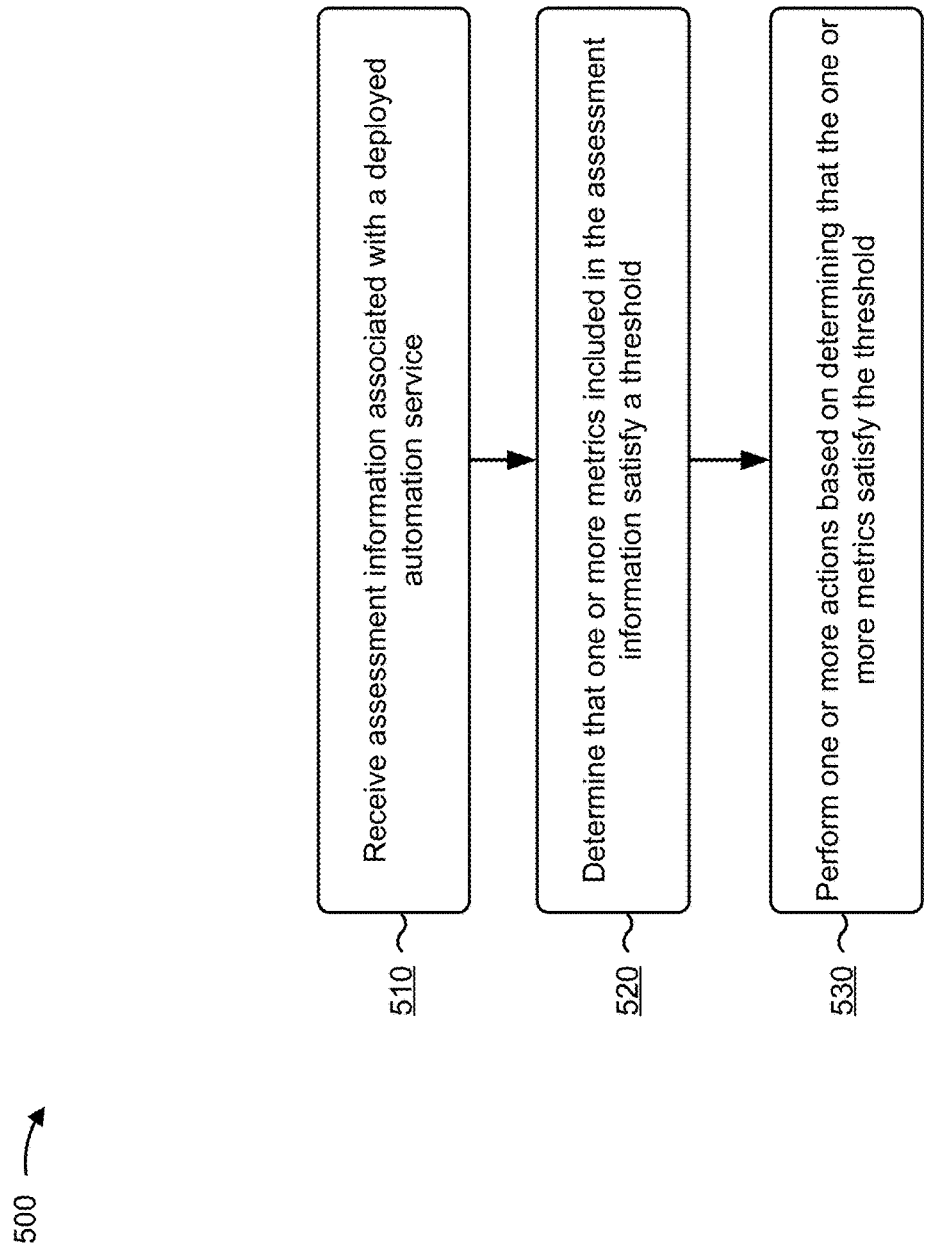
FIG. 5 is a flow chart of an example process for monitoring and analyzing assessment information for a deployed automation service and performing one or more actions associated with improving performance of the deployed automation service or one or more actions associated with deploying another automation service.

FIG. 5 is a flow chart of an example process 500 for monitoring and analyzing assessment information for a deployed automation service and performing one or more actions associated with improving performance of the deployed automation service or one or more actions associated with deploying another automation service. In some implementations, one or more process blocks of FIG. 5 may be performed by automation management platform 210. In some implementations, one or more process blocks of FIG. 5 may be performed by another device or a group of devices separate from or including automation management platform 210, such as user device 205, ontology storage device 220, project storage device 225, automation services storage device 230, feedback storage device 235, automation monitoring device 240, and/or automation application device 245.

As shown in FIG. 5, process 500 may include receiving assessment information associated with a deployed automation service (block 510). For example, automation management platform 210 may receive, from a device (e.g., user device 205, automation monitoring device 240, automation application device 245, etc.), assessment information that includes a set of metrics for measuring performance standards of a deployed automation service or a device hosting the deployed automation service. The set of metrics may include metrics associated with time, cost, quality, productivity, and/or the like.

In some implementations, automation management platform 210 may receive assessment information relating to a deployed automation service. For example, assume an automation service is deployed as part of a solution to a project and is being monitored by automation monitoring device 240. In this case, automation monitoring device 240 may obtain assessment information by monitoring the deployed automation service, and may provide the assessment information to automation management platform 210 for further processing.

Additionally, or alternatively, automation management platform 210 may receive assessment information relating to automation application device 245. For example, assume an automation service is deployed on automation application device 245 as part of a solution to a project. Further assume that automation monitoring device 240 monitors hardware of automation application device 245 and detects a hardware malfunction. In this case, automation monitoring device 240 or automation application device 245 may provide assessment information associated with the hardware malfunction to automation management platform 210.

In this way, automation management platform 210 receives assessment information that may be further processed to determine an action associated with improving performance of a deployed automation service or an action associated with deploying an alternative automation service.

As further shown in FIG. 5, process 500 may include determining that one or more metrics included in the assessment information satisfy a threshold (block 520). For example, automation management platform 210 may determine that one or more metrics of the set of metrics included in the assessment information satisfy a threshold (e.g., a time threshold, a cost threshold, a productivity threshold, a quality threshold, etc.). A threshold may be used as a limit or a boundary (e.g., an upper boundary, a lower boundary, etc.) to determine whether a deployed automation service is satisfying a particular performance standard (e.g., a performance standard relating to time, cost, productivity, quality, etc.).

In some implementations, automation management platform 210 may determine whether one or more metrics satisfy a threshold. For example, automation management platform 210 may compare a metric value and a threshold value to determine whether the deployed automation service is satisfying a particular performance standard. If automation management platform 210 determines that the metric value does not satisfy the threshold value, then automation management platform 210 may idle (e.g., perform no action other than to continue receiving assessment information). If automation management platform 210 determines that the metric value does satisfy the threshold value, then automation management platform 210 may perform one or more actions associated with improving performance of the deployed automation service or one or more actions associated with deploying an alternative automation service.

In some implementations, automation management platform 210 may combine one or more metrics, and may determine whether one or more combined metrics satisfies a threshold. For example, automation management platform 210 may assign weights to one or more metrics, and may compare the one or more combined, weighted metrics to one or more thresholds. If the combined, weighted metrics satisfy a threshold, then automation management platform 210 may perform one or more actions associated with improving performance of the deployed automation service or one or more actions associated with deploying an alternative automation service.

In this way, automation management platform 210 determines that one or more metrics are not satisfying a particular performance standard, and may perform one or more actions associated with improving performance of the deployed automation service or one or more actions associated with deploying an alternative automation service.

As further shown in FIG. 5, process 500 may include performing one or more actions based on determining that the one or more metrics satisfy the threshold (block 530). For example, automation management platform 210 may update the deployed automation service, generate a request for a hardware upgrade or hardware replacement for a device hosting the deployed automation service, generate an instruction to cause a device hosting the deployed automation service to perform an action (e.g., upgrade software, downgrade software, reboot, activate a component, execute a program, etc.), generate instructions indicating how to properly use the deployed automation service, deploy an alternative automation service, generate a recommendation instructing an interested party to carry out one or more of the above actions, and/or the like.

In some implementations, automation management platform 210 may update the deployed automation service. For example, if automation monitoring device 240 detects a software malfunction or detects that the software needs to be updated (e.g., upgraded, downgraded, etc.), then automation management platform 210 may update the deployed automation service. A software malfunction may be associated with an automation service crashing, using an excessive amount of resources (e.g., processing resources, memory resources, etc.), outputting erroneous values, or the like. In some cases, automation management platform 210 may update the deployed automation service by using one or more APIs to uninstall and reinstall the deployed automation service (e.g., if the deployed automation service has one or more corrupt files, reinstalling the automation service may correct the software malfunction). By updating the deployed automation service, automation management platform 210 conserves processing resources and network resources (e.g., of automation application device 245) that might otherwise be used to process and reprocess information lost as a result of a software malfunction.

In some implementations, automation management platform 210 may generate a request for a hardware upgrade or hardware replacement for automation application device 245. For example, if automation monitoring device 240 detects a hardware malfunction on automation application device 245, then automation management platform 210 may generate a request to update or replace the hardware that is malfunctioning. In this case, automation management platform 210 may provide the request to a device associated with a technical support team. In this way, the technical support team may update or replace the malfunctioning hardware. By requesting to update or replace malfunctioning hardware, automation management platform 210 conserves processing resources of automation application device 245 by reducing a number of processing resources that might otherwise be spent executing software via malfunctioning hardware.

In some implementations, automation management platform 210 may generate instructions indicating how to properly use the deployed automation service. For example, if automation monitoring device 240 detects a user error, automation management platform 210 may generate instructions for the user indicating how to properly use the deployed automation service. The instructions may indicate how to properly configure the deployed automation service, how to modify or update the deployed automation service, how to view output associated with the deployed automation service, and/or the like. Additionally, automation management platform 210 may provide the instructions to a device associated with a user that may interact with the deployed automation service. By generating and providing instructions indicating how to properly use the deployed automation service, automation management platform 210 reduces user error and conserves processing resources that might otherwise be used for error correction-based processing.

In some implementations, automation management platform 210 may identify and deploy an alternative automation service. For example, automation management platform 210 may search one or more data sources (e.g., ontology storage device 220, projects storage device 225, automation services storage device 230, etc.) to identify an alternative automation service, as described below, and may automatically deploy the alternative automation service. In this case, automation management platform 210 may automatically deploy the alternative automation service by using one or more APIs to remove the deployed automation service and to install and deploy the alternative automation service. Alternatively, automation management platform 210 may identify an alternative automation service and may provide the alternative automation service to automation application device 245. In this case, a user may access automation application device 245 to carry out the configuration steps needed to install and deploy the alternative automation service.

In some implementations, automation management platform 210 may identify an alternative automation service by searching the graph data structure associated with ontology storage device 220. For example, automation management platform 210 may use an automation service identifier associated with the deployed automation service to search the graph data structure for one or more automation services that are associated with the same automation domain as the deployed automation service. In some cases, automation management platform 210 may use the one or more automation services that share an automation domain with the deployed automation service as alternative automation services. In other cases, automation management platform 210 may perform a similarity analysis on the one or more automation services, and described in detail elsewhere herein, and may select an automation service with a highest similarity score as the alternative automation service.

In some implementations, automation management platform 210 may identify an alternative automation service by searching projects storage device 225 and/or automation services storage device 230. For example, automation management platform 210 may search projects storage device 225 to obtain project information for the project associated with the deployed automation service. In this case, automation management platform 210 may use a similarity analysis technique described elsewhere herein to compare the project information for the project associated with the deployed automation service and other project information stored by projects storage device 225 to identify one or more similar projects.

Additionally, automation management platform 210 may use the one or more identified similar projects to search automation services storage device 230 for one or more automation services used in association with the one or more similar projects. In some cases, automation management platform 210 may use the one or more automation services as alternative automation services. In other cases, automation management platform 210 may perform a similarity analysis on the one or more automation services, as described in detail elsewhere herein, and may select an automation service with a highest similarity score as the alternative automation service.

In some implementations, rather than search one or more data sources for project information and/or automation services information, automation management platform 210 may use an automation service identified during the analysis described with regard to FIG. 4. For example, assume automation management platform 210 determines a similarity score for one or more automation services, and that automation management platform 210 recommends an automation service with a highest score. Further assume that automation application device 245 deploys the recommended automation service. Further assume that a metric associated with the deployed automation service satisfies a threshold, triggering automation management platform 210 to identify an alternative automation service. In this case, automation management platform 210 may select an automation service with the second highest similarity score as the alternative automation service. In this way, automation management platform 210 conserves processing resources relative to performing another recommendation analysis to determine an alternative automation service.

In some implementations, automation management platform 210 may generate a recommendation instructing an interested party to carry out one or more of the actions described above. For example, automation management platform 210 may generate a recommendation to update the deployed automation service, a recommendation to provide a user with instructions on how to properly use the deployed automation service, a recommendation to deploy an alternative automation service, and/or the like. An interested party may be a user that interacts with an automation service, such as a project manager, a member of a technical support team, and/or the like.

By performing one or more actions to update or replace a deployed automation service and/or a device hosting the deployed automation service, automation management platform 210 maximizes the efficiency and the effectiveness of an automation service.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
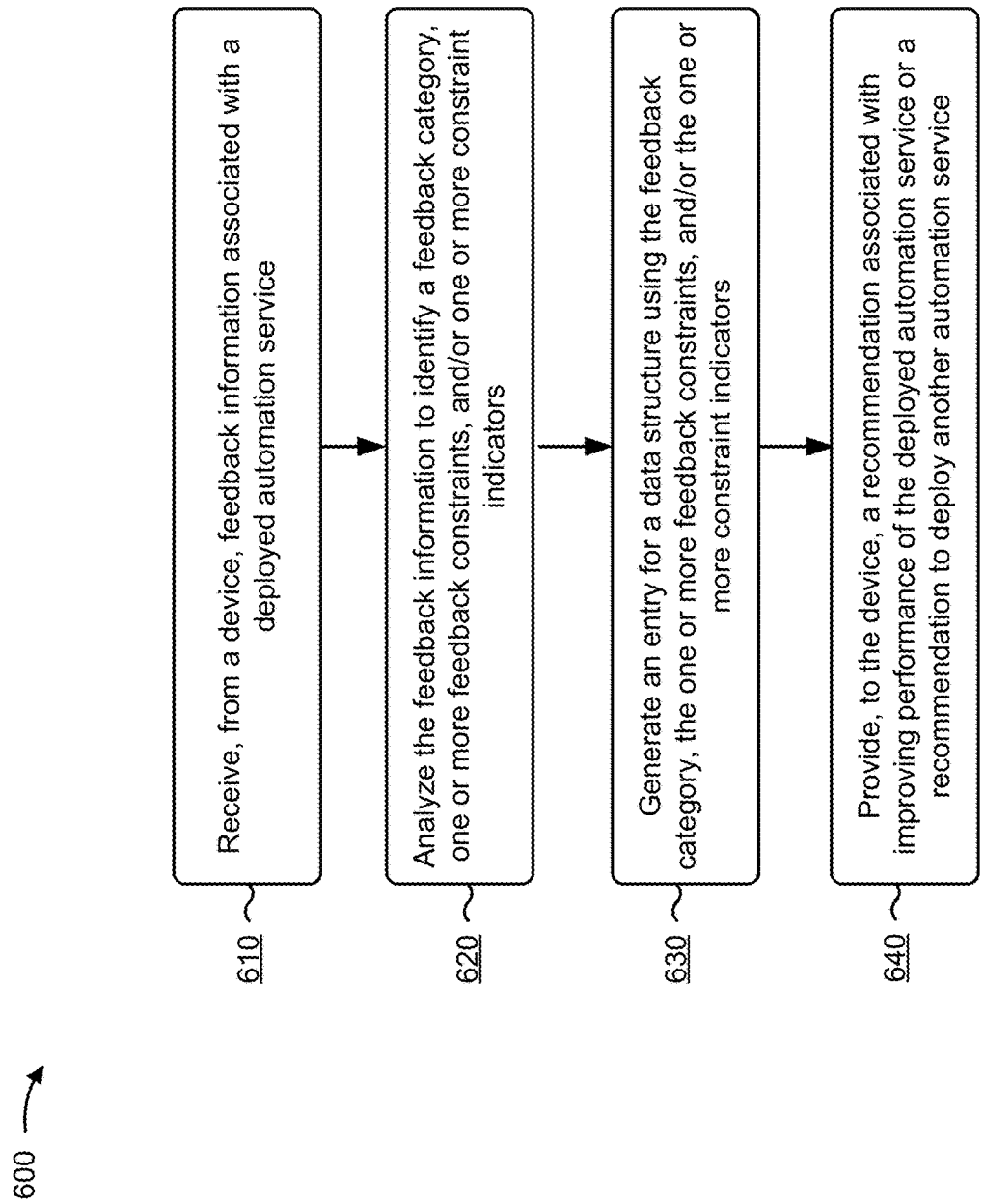
FIG. 6 is a flow chart of an example process for analyzing feedback information for a deployed automation service and generating a recommendation associated with improving performance of the deployed automation service or a recommendation to deploy another automation service.

FIG. 6 is a flow chart of an example process 600 for analyzing feedback information for a deployed automation service and generating a recommendation associated with improving performance of the deployed automation service or a recommendation to deploy another automation service. In some implementations, one or more process blocks of FIG. 6 may be performed by automation management platform 210. In some implementations, one or more process blocks of FIG. 6 may be performed by another device or a group of devices separate from or including automation management platform 210, such as user device 205, ontology storage device 220, project storage device 225, automation services storage device 230, feedback storage device 235, automation monitoring device 240, and/or automation application device 245.

As shown in FIG. 6, process 600 may include receiving, from a device, feedback information associated with a deployed automation service (block 610). For example, automation management platform 210 may receive, from user device 205 or automation application device 245, feedback information associated with a deployed automation service. Feedback information may include general feedback (e.g., feedback that may be given for any automation service) and/or specific feedback (e.g., feedback for a particular automation service). Feedback information may be received as a free-form text query, as a structured query, and/or the like. In some implementations, feedback information may be provided by a user interface of user device 205 or automation application device 245. The user interface provides a user with an opportunity to input an explanation to a problem or an issue relating to a deployed automation service (i.e., to input feedback information).

In some implementations, automation management platform 210 may receive feedback information associated with general feedback. For example, a user may interact with a user interface of user device 205 or automation application device 245 to input general feedback, which may cause user device 205 or automation application device 245 to send the general feedback to automation management platform 210. General feedback may include feedback relating to an installation of an automation service, feedback relating to a user experience (e.g., an experience configuring an automation service, an experience viewing results of an automation service, etc.), feedback relating to documentation associated with the automation service (e.g., instructions on how to configure or use an automation service), and/or the like.

Additionally, or alternatively, automation management platform 210 may receive feedback information associated with specific feedback. For example, a user may interact with a user interface of user device 205 or automation application device 245 to input specific feedback relating to a deployed automation service, which may cause user device 205 or automation application device 245 to send the specific feedback to automation management platform 210. Specific feedback may include feedback relating to particular features of the deployed automation service, such as a features that may not be present in other automation services (e.g., a specific feature relating to installation, a specific feature relating to user experience, a specific feature relating to documentation, a specific feature relating to device compatibility, etc.).

By receiving feedback information associated with a deployed automation service, automation management platform 210 may process the feedback information and may perform one or more actions associated with improving performance of the deployed automation service or one or more actions to deploy another automation service, as described further herein.

As further shown in FIG. 6, process 600 may include analyzing the feedback information to identify a feedback category, one or more feedback constraints, and/or one or more constraint indicators (block 620). For example, automation management platform 210 may analyze one or more feedback keywords included in the feedback information to identify a feedback category, one or more feedback constraints, and/or one or more constraint indicators.

A feedback keyword may be a noun, a verb, and/or any word included in the feedback information that is associated with a particular issue relating to the deployed automation service. A feedback category may be a category that includes general and/or specific feedback associated with the category, such as an installation category, a user experience category, a documentation category, a compatibility category, and/or the like. A feedback constraint may be any software application, software element, and/or software execution requirement associated with the deployed automation service. A software execution requirement may include a memory requirement, a bandwidth requirement, an operating system requirement, and/or the like. A constraint indicator may be a value (e.g., a string of text) indicating whether a particular constraint is compatible with a particular automation service.

In some implementations, if the feedback information is free-form text, automation management platform 210 may analyze the feedback information using one or more natural language processing techniques. For example, automation management platform 210 may use one or more natural language processing techniques to identify a feedback category and/or one or more feedback constraints, as described elsewhere herein. As an example, assume the feedback information includes free-form text stating "Deployed automation service is not compatible with operating system version 1.1." In this case, automation management platform 210 may use a natural language processing technique to identify "compatibility" as the feedback category and "operating system version 1.1" as the feedback constraint.

In some implementations, if the feedback information is structured text, automation management platform 210 may analyze the structured text of the feedback information. For example, the structured text may include metadata indicating the feedback categories and/or feedback constraints, and automation management platform 210 may read the metadata to identify the feedback category and/or the one or more feedback constraints.

In this way, automation management platform 210 identifies a feedback category and/or one or more feedback constraints that may be stored in a data structure to allow subsequent processing to generate a recommendation associated with improving performance of the deployed automation service or a recommendation to deploy another automation service.

As further shown in FIG. 6, process 600 may include generating an entry for a data structure using the feedback category and/or the one or more feedback constraints (block 630). For example, feedback storage device 235 may use a graph data structure to store feedback information for automation services, and automation management platform 210 may generate one or more nodes and/or one or more edges for the graph data structure using the feedback category and/or the one or more feedback constraints.

In some implementations, feedback storage device 235 may store feedback information for automation services using a graph data structure that includes nodes and edges. For example, the graph data structure may use an automation service identifier as a root node, feedback categories and/or feedback constraints as child nodes of the root node, and constraint indicators as the edges.

As an example, if a root node is an automation service identifier, a first child node is operating system version 1.0, then constraint indicators may include string values such as "works with," "is compatible with," "does not work with," "is not compatible with," and/or the like. In some implementations, feedback storage device 235 may store feedback information using a different data structure, such as a linked-list, an array, a hash table, a tree, and/or the like. In this way, feedback storage device 235 is able to store feedback information in a manner that associates feedback categories and feedback constraints.

In some implementations, automation management platform 210 may generate an entry for a graph data structure. For example, automation management platform 210 may generate an entry that includes an automation service identifier, a child node value indicating a feedback category, one or more additional child node values indicating feedback constraints, and one or more edge values identifying constraint indicators. In this case, automation management platform 210 may provide the automation service identifier, the child node value, the additional child node values, and the edge values to feedback storage device 235. Feedback storage device 235 may use the automation service identifier to store the values with other child node values that are stored in association with the deployed automation service.

In some implementations, prior to generating an entry for the graph data structure, automation management platform 210 may determine whether the graph data structure includes node values and/or edge values that match the identified feedback category and/or feedback constraints. In some implementations, a user may review or approve the entry prior to the entry being added to the graph data structure. In this way, automation management platform 210 conserves network resources (e.g., memory resources of feedback storage device 235) by only storing feedback information that has yet to be reported.

By storing feedback information, automation management platform 210 is able to subsequently reference the feedback information when generating a recommendation associated with improving performance of the deployed automation service or when generating a recommendation to deploy another automation service.

As further shown in FIG. 6, process 600 may include providing, to the device, a recommendation associated with improving performance of the deployed automation service or a recommendation to deploy another automation service (block 640). For example, automation management platform 210 may generate a recommendation, and may provide the recommendation to user device 205, automation application device 245, a device associated with a project manager, a device associated with a technical support team, and/or the like. The recommendation may be a recommendation to update the deployed automation service (e.g., by reinstalling, upgrading, or downgrading software), a recommendation that includes instructions indicating how to properly use the deployed automation service, a recommendation to deploy another automation service, and/or the like.

In some implementations, automation management platform 210 may generate a recommendation by searching feedback storage device 235 for a feedback constraint that is compatible with the deployed automation service. For example, automation management platform 210 may use the feedback category and/or the one or more feedback constraints to search the graph data structure associated with feedback storage device 235 to determine whether a feedback constraint is compatible with the deployed automation service. In this case, a constraint indicator (e.g., an edge value connecting to the feedback constraint node) may identify whether a feedback constraint is compatible with the deployed automation service. If automation management platform 210 identifies a feedback constraint that is compatible with the deployed automation service, then automation management platform 210 may generate a recommendation that includes the feedback constraint. In this case, automation management platform 210 may provide the feedback constraint to user device 205 or automation application device 245. If a compatible feedback constraint is not found, automation management platform 210 may generate a recommendation to have a technical support team investigate the issue.

As an example, assume that automation application device 245 hosts the deployed automation service using operating system version 1.0, and upgrades to operating system version 1.1, causing the deployed automation service to crash. Further assume that automation management platform 210 receives feedback information indicating that the deployed automation service is not compatible with operating system version 1.1. In this case, automation management platform 210 may search the graph data structure associated with feedback storage device 235 to determine that the deployed automation service is compatible with operating system version 1.0. This may cause automation management platform 210 to generate a recommendation to downgrade to operating system version 1.0 to be able to support the deployed automation service. Additionally, automation management platform 210 may provide the recommendation to automation application device 245.

In some implementations, automation management platform 210 may generate and provide recommendations in a manner described elsewhere herein (e.g., block 530). In some implementations, automation management platform 210 may make one or more API calls to automatically carry out one or more of the recommendations or actions described herein. By automatically carrying out one or more recommendations or actions, automation management platform 210 conserves network resources by resolving issues associated with the feedback information without intervention of other network devices (e.g., a device used by a member of a technical support team) or human operators.

By generating a recommendation associated with updating or replacing a deployed automation service, automation management platform 210 maximizes the efficiency and the effectiveness of a deployed automation service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
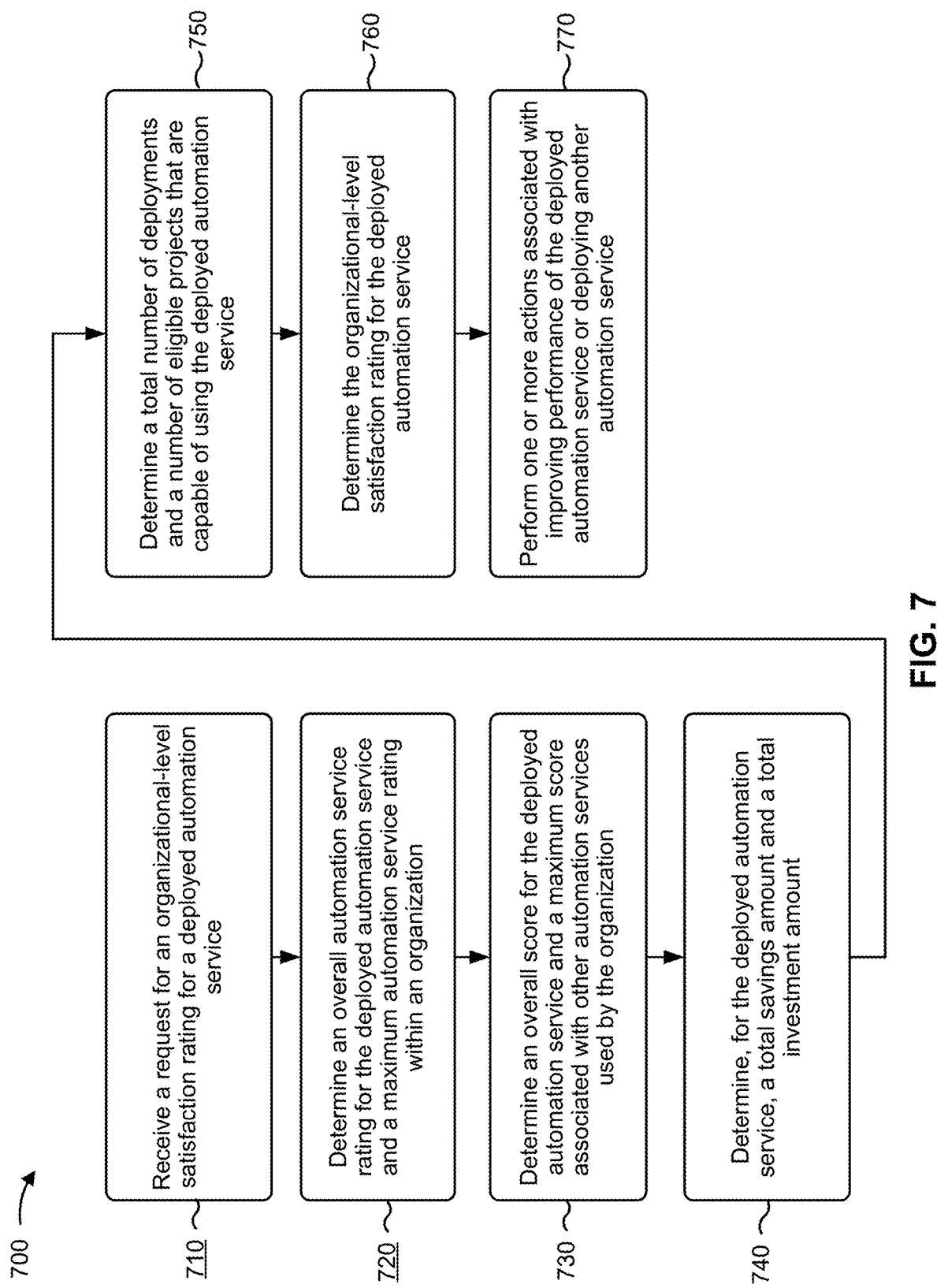
FIG. 7 is a flow chart of an example process for determining an organizational-level satisfaction rating for a deployed automation service and performing one or more actions associated with improving performance of the deployed automation service or one or more actions associated with deploying another automation service.

FIG. 7 is a flow chart of an example process 700 for determining an organizational-level satisfaction rating for a deployed automation service and performing one or more actions associated with improving performance of the deployed automation service or one or more actions associated with deploying another automation service. In some implementations, one or more process blocks of FIG. 7 may be performed by automation management platform 210. In some implementations, one or more process blocks of FIG. 7 may be performed by another device or a group of devices separate from or including automation management platform 210, such as user device 205, ontology storage device 220, project storage device 225, automation services storage device 230, feedback storage device 235, automation monitoring device 240, and/or automation application device 245.

As shown in FIG. 7, process 700 may include receiving a request for an organizational-level satisfaction rating for a deployed automation service (block 710). For example, automation management platform 210 may receive, from a device (e.g., user device 205, automation application device 245, a device associated with a project manager or a business manager, etc.), a request for an organizational-level satisfaction rating for a deployed automation service.

An organizational-level satisfaction rating may allow a user to measure an overall effectiveness level of a deployed automation service. The organizational-level satisfaction rating may be associated with a set of satisfaction factors, such as one or more automation service ratings by individual users that deployed the automation service for particular projects, one or more scores (e.g., sentiment scores) relating to feedback for the deployed automation service, an amount of savings from using the deployed automation service (e.g., instead of a manual solution), an investment in the automation service (e.g., development cost, maintenance cost, etc.), a number of deployments, a number of eligible projects (e.g., projects capable of using the automation service that may or may not have deployed the automation service), and/or the like. The set of satisfaction factors may be used as part of a function to determine the organizational-level satisfaction rating, as described further herein.

In some implementations, automation management platform 210 may receive a request for an organization-level satisfaction rating. For example, a user (e.g., a project manager) may access a user interface of a device to request an organization-level satisfaction rating for a deployed automation service.

In this way, automation management platform 210 may process the request to determine the organizational-level satisfaction rating.

As further shown in FIG. 7, process 700 may include determining an overall automation service rating for the deployed automation service and a maximum automation service rating within an organization (block 720). For example, automation management platform 210 may determine an overall automation service rating and a maximum automation service rating by searching automation services storage device 230. The overall automation service rating and the maximum automation service rating allow automation management platform 210 to determine how the deployed automation service compares to an automation service with the maximum automation service rating, as described further herein.

In some implementations, automation management platform 210 may obtain an overall automation service rating. For example, automation management platform 210 may use an automation service identifier for the deployed automation service to search automation services storage device 230 for an overall automation service rating. In some implementations, automation management platform 210 may obtain individual automation service ratings for the deployed automation service, and may process the individual automation service ratings to determine an overall automation service rating. In some implementations, automation management platform 210 may obtain a maximum automation service rating in a similar manner.

In this way, automation management platform 210 may determine the overall automation service rating and the maximum automation service rating, and may use the ratings in determining the organizational-level satisfaction rating, as described further herein.

As further shown in FIG. 7, process 700 may include determining an overall score for the deployed automation service and a maximum score associated with other automation services used by the organization (block 730). For example, automation management platform 210 may obtain feedback information associated with the deployed automation service and feedback information associated with the other automation services. In this case, automation management platform 210 may analyze the feedback information to determine an overall score for the deployed automation service and a maximum score associated with the other automation services, and the scores may be used as part of determining the organization-level satisfaction rating.

In some implementations, automation management platform 210 may obtain feedback information. For example, automation management platform 210 may use an automation service identifier for the deployed automation service to search feedback storage device 235 for feedback information associated with the deployed automation service. Additionally, automation management platform 210 may obtain the feedback information associated with the other automation services in a similar manner.

In some implementations, automation management platform 210 may analyze feedback information using a third party score analyzer (e.g., a third party sentiment analyzer). For example, automation management platform 210 may use one or more APIs to provide feedback information to a third party score analyzer. In this case, the third party score analyzer may output scores (e.g., sentiment scores) for each instance of feedback associated with the deployed automation service and for each instance of feedback associated with the other automation services. In some implementations, automation management platform 210 may analyze feedback information using a score analyzer that is locally hosted within automation management platform 210.

In some implementations, automation management platform 210 may determine an overall score for the deployed automation service. For example, automation management platform 210 may provide feedback information as input to a score analyzer, and the score analyzer may output user scores that may represent an opinion or a subjective evaluation of a user's view of the deployed automation service. In this case, the feedback information may include feedback for individual users that have used the deployed automation service, and automation management platform 210 may use the user scores to determine an overall score (e.g., an average score, a total score, etc.).

In some implementations, automation management platform 210 may determine a maximum score associated with other automation services used by the organization. For example, feedback storage device 235 may store feedback information for all (or some) automation services associated with an organization (the "other" automation services), and automation management platform 210 may provide the feedback information for the other automation services as input to a feedback analyzer. In this case, the feedback analyzer may output user scores, in the manner described above. Additionally, automation management platform 210 may use the user scores to determine an overall score for each automation service of the other automation services, and may use the overall scores to determine a maximum score associated with the other automation services.

By determining an overall score for the deployed automation service and a maximum score associated with the other automation services, automation management platform 210 is able to use the scores in determining the organizational-level satisfaction rating, as described further herein.

As further shown in FIG. 7, process 700 may include determining, for the deployed automation service, a total savings amount and a total investment amount (block 740). For example, automation management platform 210 may determine a total savings amount and a total investment amount as part of determining the organizational-level satisfaction rating. A total savings amount may be a total amount of savings associated with an automation service on an organizational level (e.g., by using the automation service instead of using a manual service). A total investment amount may be a total cost associated with developing and/or maintaining an automation service.

In some implementations, automation management platform 210 may determine a total savings amount. For example, assume automation services storage device 230 stores information indicating individual amounts of savings associated with particular deployments of an automation service. In this case, automation management platform 210 may query automation services storage device 230 to obtain the information indicating the individual amounts of savings, and may process the information indicating the individual amounts of savings to determine a total amount of savings. In some cases, automation services storage device 230 may store a total savings amount, and automation management platform 210 may search automation services storage device 230 to obtain the total savings amount.

In some implementations, automation management platform 210 may determine a total investment amount. For example, assume automation services storage device 230 stores information indicating a total cost associated with developing an automation service and information indicating a total cost associated with maintaining an automation service. In this case, automation management platform 210 may search automation services storage device 230 to obtain the information indicating the total cost associated with developing and maintaining the automation service.

In this way, automation management platform 210 may determine a total savings amount and a total investment amount as part of determining the organizational-level satisfaction rating, as described further herein.

As further shown in FIG. 7, process 700 may include determining a total number of deployments and a number of eligible projects that are capable of using the deployed automation service (block 750). For example, automation management platform 210 may determine a total number of deployments, and may perform a similarity analysis associated with a project-to-automation services classification to determine a number of eligible projects. An eligible project may be any project that may use, or that is capable of using, the deployed automation service. A total number of deployments may be a total number of times an automated service has been deployed (e.g., an automation service may deploy in a number of different projects).

In some implementations, automation management platform 210 may determine a total number of deployments associated with a deployed automation service. For example, automation services storage device 230 may store information associated with each deployment of an automation service. In this case, automation management platform 210 may execute a query to automation services storage device 230 to determine a total number of times that the automation service has been deployed.

In some implementations, automation management platform 210 may perform a similarity analysis on projects that are using the deployed automation service to determine similarity scores for the projects, as described elsewhere herein. In this case, automation management platform 210 may identify a project with a minimum similarity score. Additionally, automation management platform 210 may perform a similarity analysis on additional projects that did not deploy the automation service and that are capable of deploying the automation service to determine one or more additional similarity scores. In this case, automation management platform 210 may select one or more additional projects of the set of additional projects if an additional project has an additional similarity score that exceeds the minimum score.

In this way, automation management platform 210 may determine a total number of deployments and a number of eligible projects, and may use the total number of deployments and the number of eligible projects in determining the organizational-level satisfaction rating.

As further shown in FIG. 7, process 700 may include determining the organizational-level satisfaction rating for the deployed automation service (block 760). For example, automation management platform 210 may use a satisfaction formula to determine the organizational-level satisfaction rating for the deployed automation service. The satisfaction formula may include the overall automation service rating, the maximum automation service rating, the overall score, the maximum score, the total savings amount, the total investment amount, the total number of deployments, and/or the number of eligible projects to determine the organizational-level satisfaction rating.

In some implementations, automation management platform 210 may determine the organizational-level satisfaction rating. For example, automation management platform 210 may determine the organizational-level satisfaction rating to determine an effectiveness level of the deployed automation service. As an example, automation management platform 210 may determine the organizational-level satisfaction rating based on the following formula:

$$\Delta = w_{1r}\frac{Rating}{MaxRating} + w_{1s}\frac{Score}{MaxScore} + w_2\frac{Savings}{Investment} + w_3\frac{\# \text{ of Deployments}}{\# \text{ of EligibleProjects}} \qquad (1)$$

In equation 1, a delta ($\Delta$) value may represent an organizational-level satisfaction rating. The organizational-level satisfaction rating may indicate an overall effectiveness level of an automation service, and may include four ratios. In some cases, the four ratios may add up to the value one. The first ratio may represent a ratio between the overall automation service rating and the maximum automation service rating. The closer the ratio is to one, the more popular the deployed automation service is to the automation service with the maximum automation service rating within the organization. The second ratio may represent a ratio between the maximum score and the total savings amount. The closer the ratio is to one, the more positive the feedback associated with the deployed automation service. The third ratio may represent a ratio between the total savings and the total investment. The larger the ratio, the more financially beneficial the automation service. The fourth ratio may represent a ratio between the number of deployments and the number of eligible projects. A larger ratio may indicate that a deployed automation service is a popular automation service (e.g., which may be an indicator in organizational-level effectiveness).

In some implementations, automation management platform 210 may determine an effectiveness level of a deployed automation service using a different function, such as function relating to productivity, quality, profit, growth, stability, flexibility, adaptability, and/or the like.

By determining the organizational-level satisfaction rating for the deployed automation service, automation management platform 210 may use the satisfaction rating to provide a recommendation ensuring that a best-fit automation service is used for the project.

As further shown in FIG. 7, process 700 may include performing one or more actions associated with improving performance of the deployed automation service or deploying another automation service (block 770). For example, automation management platform 210 may determine whether the organizational-level satisfaction rating satisfies a performance threshold, may update the deployed automation service, may deploy another automation service, may generate a recommendation to update the deployed automation or to deploy another automation service, provide the recommendation to an interested party, and/or the like.

In some implementations, automation management platform 210 may determine whether the organizational-level satisfaction rating satisfies a performance threshold. For example, automation management platform 210 may compare the organizational-level satisfaction rating to one or more performance thresholds. A performance threshold may be used as a limit or a boundary to determine whether the organizational-level satisfaction rating is satisfying a particular effectiveness level. If the organizational-level satisfaction rating does not satisfy a performance threshold, then automation management platform 210 may idle and continue receiving assessment information and/or feedback information associated with the deployed automation service. If the organizational-level satisfaction rating satisfies a performance threshold, then automation management platform 210 may perform one or more actions.

In some implementations, automation management platform 210 may perform one or more actions, as described elsewhere herein (e.g., block 530, block 640, etc.). In some implementations, automation management platform 210 may provide the recommendation to user device 205, automation application device 245, a device associated with a project manager, a device associated with a technical support team, and/or the like.

By using the organizational-level satisfaction rating to perform one or more actions, automation management platform 210 ensures that the automation service used to service the project is a best-fit automation service.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

By using natural language processing and similarity analysis techniques to identify one or more automation services, automation management platform 210 identifies a best-fit automation service. Furthermore, by receiving and analyzing assessment information and/or feedback information, automation management platform 210 is able to perform one or more actions associated with improving performance of the deployed automation service or one or more actions associated with deploying an alternative automation service.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a user device, a request for an automation service for a project;
analyze the request to identify one or more input keywords;
obtain information associated with a first set of automation services by using the one or more input keywords to search a first data source;
analyze, using a first similarity analysis technique, the information associated with the first set of automation services to identify a set of candidate automation services;
obtain, from a second data source, project information for a set of projects and additional project information for a set of additional projects,
the set of projects including first projects that use a candidate automation service of the set of candidate automation services, and
the set of additional projects including second projects that share at least one project characteristic with the project information;
determine one or more similar projects by using a second similarity analysis technique to analyze the project information for the set of projects and the additional project information for the set of additional projects;
obtain, from a third data source, automation services information for a second set of automation services different from the first set of automation services and used by the one or more similar projects;
provide, to the user device, a recommendation that identifies a particular automation service of the set of candidate automation services or the second set of automation services;
deploy, using one or more application programming interfaces, the particular automation service for the project; and
receive, based on deploying the particular automation service, assessment information associated with the particular automation service,
the assessment information including a set of metrics for measuring performance standards associated with the particular automation service; and
selectively:
provide, based on determining that a metric, of the set of metrics, satisfies a threshold, a notification to the user device, and perform one or more actions based on determining that the metric satisfies the threshold, and
idle, based on determining that the metric, of the set of metrics, does not satisfy the threshold.

2. The device of claim 1, where the one or more processors, when analyzing the request, are to:
assign one or more parts of speech tags to one or more words associated with the request,
remove one or more stop words associated with the request, and
identify the input keywords by using the one or more parts of speech tags to identify at least one of one or more nouns or one or more verbs associated with the request.

3. The device of claim 1, where the first data source is associated with a graph data structure, and
where the information associated with the first set of automation services includes at least one of:
information indicating one or more automation domains,
information indicating one or more automation purposes,
information indicating one or more automation levers,
information indicating one or more automation constraints,
information indicating one or more automation service identifiers, or
information indicating at least one of one or more nouns, or one or more verbs, associated with the one or more automation service identifiers.

4. The device of claim 3, where the one or more processors, when analyzing the information associated with the first set of automation services to identify the set of candidate automation services, are to:
  determine one or more similarity scores for the information indicating the at least one of the one or more nouns or the one or more verbs,
    the one or more similarity scores indicating at least one of a lexical similarity or a semantic similarity between the information indicating the at least one of the one or more nouns or the one or more verbs and the one or more input keywords associated with the request,
  determine, using the one or more similarity scores, one or more overall similarity scores for the information indicating the one or more automation levers,
  identify an automation lever, of the one or more automation levers, with a highest overall similarity score of the one or more overall similarity scores,
  select information indicating an automation purpose associated with the automation lever, and
  identify information indicating a set of automation service identifiers as the set of candidate automation services, the set of automation service identifiers being associated with the automation purpose.

5. The device of claim 1, where the one or more processors, when determining the one or more similar projects, are to:
  determine one or more similarity scores between a first set of project characteristics, associated with the set of projects, and a second set of project characteristics associated with the set of additional projects,
  determine one or more overall similarity scores for the set of additional projects,
  determine that an overall similarity score, of the one or more overall similarity scores, satisfies a threshold level of similarity with the set of projects, and
  determine that a project, of the set of additional projects and associated with the overall similarity score, is a similar project based on the overall similarity score satisfying the threshold level of similarity with the set of projects.

6. The device of claim 5, where the one or more processors, when determining the one or more similarity scores, are to:
  determine one or more first data types, for the first set of project characteristics associated with the set of projects, and one or more second data types for the second set of project characteristics associated with the set of additional projects, and
  determine the one or more similarity scores using at least one of:
    a Cosine similarity analysis technique,
    a Boolean or binary match similarity analysis technique,
    a Jaccard similarity analysis technique, or
    a Euclidean similarity analysis technique, and
    where the device is to select a technique based on a data type of the one or more first data types and the one or more second data types.

7. The device of claim 1, where the one or more processors, when performing the one or more actions, are to:
  perform one or more first actions, associated with improving performance of the particular automation service, or one or more second actions associated with deploying an alternative automation service different from the particular automation service,
    the one or more first actions including at least one of:
      updating the particular automation service,
      generating a request for a hardware upgrade or a hardware replacement for a device hosting the particular automation service,
      generating an instruction to cause a software upgrade, a software degrade, or a software install to occur on a device hosting the particular automation service, or
      generating instructions indicating how to properly use the particular automation service.

8. A method, comprising:
receiving, by a device and from a user device, a request for an automation service for a project,
  the request including at least one of:
    information associated with a task of the project,
    information indicating one or more project characteristics of the project, or
    information associated with one or more automation services;
obtaining, by the device and from one or more data sources, at least one of project information for a set of projects or automation services information for a first set of automation services;
determining, by the device, at least one of one or more similar projects or one or more similar automation services by analyzing the at least one of the project information or the automation services information,
  the one or more similar projects being associated with one or more first automation services of the one or more automation services, or the one or more similar automation services being associated with one or more second automation services of the one or more automation services and different from the one or more first automation services;
providing, by the device and to the user device, a recommendation that identifies a particular automation service of the one or more first automation services or the one or more second automation services;
deploying, using one or more application user interfaces, the particular automation service for the project; and
receiving, by the device and based on deploying the particular automation service, assessment information associated with the particular automation service,
  the assessment information including a set of metrics for measuring performance standards associated with the particular automation service; and
selectively:
  providing, by the device and based on determining that a metric, of the set of metrics, satisfies a threshold, a notification to the user device, and perform one or more actions based on determining that the metric satisfies the threshold, and
  idling, by the device and based on determining that the metric, of the set of metrics, does not satisfy the threshold.

9. The method of claim 8, further comprising:
analyzing the request to identify one or more input keywords;
obtaining information associated with a second set of automation services by using the one or more input keywords to search a graph data structure;
analyzing, by performing a similarity analysis technique, the information associated with the second set of automation services to identify a set of candidate automation services; and where providing the recommendation comprises:
provide the recommendation to the user device,
the recommendation identifying the set of candidate automation services.

10. The method of claim 8, where determining the one or more similar projects by analyzing the project information comprises:
comparing project characteristics of the project with project characteristics of the set of projects,
determining a set of overall similarity scores for the set of projects based on comparing the project characteristics of the project with the project characteristics of the set of projects,
determining that one or more projects of the set of projects satisfy a threshold level of similarity with the project associated with the request,
identifying the one or more projects as the one or more similar projects, and
obtaining the one or more first automation services associated with the one or more similar projects; and
where providing the recommendation comprises:
providing the recommendation that identifies the one or more automation services used by the one or more similar projects.

11. The method of claim 8, where determining the one or more similar automation services by analyzing the automation services information comprises:
comparing automation service characteristics associated with the request with automation service characteristics of the first set of automation services,
determining a set of overall similarity scores for the first set of automation services based on comparing the automation service characteristics associated with the request with the automation service characteristics of the first set of automation services,
determining that one or more automation services of the first set of automation services satisfies a threshold level of similarity with the one or more automation services associated with the request, and
identifying the one or more automation services of the first set of automation services as the one or more similar automation services; and
where providing the recommendation comprises:
providing the recommendation that includes one or more automation service identifiers for the one or more similar automation services.

12. The method of claim 8, further comprising:
receiving feedback information associated with the particular automation service;
analyzing the feedback information to identify an issue relating to the particular automation service;
providing the feedback information to a data structure associated with a storage device;
generating a recommendation associated with improving performance of the particular automation service or a recommendation to deploy another automation service different from the particular automation service; and
providing the recommendation to another device.

13. The method of claim 12, where generating the recommendation comprises:
obtaining, from the data structure associated with the storage device, feedback information that includes a feedback constraint capable of resolving the issue relating to the particular automation service, and
generating a recommendation to update the particular automation service with the feedback constraint that is capable of resolving the issue relating to the particular automation service.

14. A non-transitory computer-readable medium storing instructions, the instructions comprising:
one or more instructions that, when executed by one or more processors, cause the one or more processors to:
receive, from a user device, a request for an automation service for a project;
analyze the request to identify one or more input keywords;
obtain, by using the one or more input keywords to search one or more data sources, at least one of project information for a set of projects or automation services information for a first set of automation services;
determine at least one of one or more similar projects or one or more similar automation services by analyzing the at least one of the project information or the automation services information;
provide, to the user device, a recommendation that identifies a particular automation service of one or more automation services associated with the at least one of the one or more similar projects or the one or more similar automation services;
deploy, using one or more application programming interfaces, the particular automation service for the project; and
receive, based on deploying the particular automation service, assessment information associated with the particular automation service,
the assessment information including a set of metrics for measuring performance standards associated with the particular automation service; and
selectively:
provide, based on determining that a metric, of the set of metrics, satisfies a threshold, a notification to the user device, and perform one or more actions based on determining that the metric satisfies the threshold, and
idle, based on determining that the metric, of the set of metrics, does not satisfy the threshold.

15. The non-transitory computer-readable medium of claim 14, where the one or more instructions, when executed by the one or more processors, further cause the one or more processors to:
classify the request into a first class, a second class, or a third class,
where classifying the request is associated with whether the request includes:
project information,
automation services information, or
neither project information nor automation services information; and
where the one or more instructions, that cause the one or more processors to obtain the at least one of the project information or the automation services information, are to:
determine whether to obtain the at least one of the project information or the automation services information based on classifying the request.

16. The non-transitory computer-readable medium of claim 14, where the one or more instructions, when executed by the one or more processors, further cause the one or more processors to:

receive a request for an organizational-level satisfaction rating for the particular automation service;

determine the organizational-level satisfaction rating for the particular automation service, the organizational-level satisfaction rating being associated with measuring an overall effectiveness level of the particular automation service; and perform one or more first actions, associated with improving performance of the particular automation service, or one or more second actions, associated with deploying another automation service, based on the organizational-level satisfaction rating.

17. The non-transitory computer-readable medium of claim 14, where the one or more instructions, when executed by the one or more processors, further cause the one or more processors to:

obtain, by using the one or more input keywords to search an additional data source, information associated with a second set of automation services;

analyze, using a similarity analysis technique, the information associated with the second set of automation services to identify a set of candidate automation services; and where the one or more instructions, that cause the one or more processors to provide the recommendation, cause the one or more processors to:

provide the recommendation to the user device, the recommendation identifying the set of candidate automation services.

18. The non-transitory computer-readable medium of claim 14, where the one or more instructions, that cause the one or more processors to receive the request for the automation service, cause the one or more processors to:

receive the request for the automation service for the project, the request identifying a first automation service; and where the one or more instructions, that cause the one or more processors to determine the one or more similar automation services, cause the one or more processors to:

compare a first set of automation services characteristics associated with the first automation service with a second set of automation services characteristics associated with the first set of automation services, determine one or more overall similarity scores for the first set of automation services based on comparing the first set of automation services characteristics with the second set of automation services characteristics, determine that an overall similarity score, of the one or more overall similarity scores, satisfies a threshold level of similarity with the first automation service, and determine that the particular automation service associated with the overall similarity score is a similar automation service based on the overall similarity score satisfying the threshold level of similarity with the first automation service.

19. The non-transitory computer-readable medium of claim 14, where the one or more instructions, when executed by the one or more processors, further cause the one or more processors to:

receive at least one of assessment information or feedback information associated with the particular automation service;

analyze the at least one of the assessment information or the feedback information associated with the particular automation service; and perform one or more first actions, associated with improving performance of the particular automation service, or one or more second actions, associated with deploying an alternative automation service, based on a result of analyzing the at least one of the assessment information or the feedback information.

20. The device of claim 1, where the one or more processors are further to:

analyze the request for the automation service using a natural language processing technique.

* * * * *